US006405533B1

United States Patent
Rastegar et al.

(10) Patent No.: US 6,405,533 B1
(45) Date of Patent: Jun. 18, 2002

(54) APPARATUS FOR REDUCING VIBRATION INPUTS TO A DEVICE AND/OR FOR MICROPOSITIONING

(75) Inventors: Jahangir Rastegar, Stony Brook; Farshad Khorrami, Brooklyn, both of NY (US)

(73) Assignees: Polytechnic University; Omnitek Research & Development, Inc., both of Brooklyn, NY (US)

(*) Notice: Subject to any disclaimer, the term of this patent is extended or adjusted under 35 U.S.C. 154(b) by 0 days.

(21) Appl. No.: 09/480,042

(22) Filed: Jan. 10, 2000

Related U.S. Application Data

(62) Division of application No. 09/059,792, filed on Apr. 13, 1998, now Pat. No. 6,154,000, which is a continuation-in-part of application No. 08/565,906, filed on Dec. 1, 1995, now Pat. No. 5,742,145, which is a division of application No. 08/301,698, filed on Sep. 7, 1994, now Pat. No. 5,604,413.

(51) Int. Cl.[7] .................................................. F15B 7/00

(52) U.S. Cl. ............................... 60/545; 60/583; 92/90

(58) Field of Search ....................... 60/545, 583; 92/89, 92/90

(56) References Cited

U.S. PATENT DOCUMENTS

| 3,071,930 A | 1/1963 | Moulin | 60/533 |
|---|---|---|---|
| 4,701,113 A | * 10/1987 | Eickmann | 92/45 |
| 4,803,393 A | * 2/1989 | Takahashi | 123/478 |
| 5,074,654 A | 12/1991 | Alden et al. | 60/545 |
| 6,054,197 A | 4/2000 | Rastegar | |
| 6,080,066 A | 6/2000 | Rastegar | |
| 6,082,072 A | 7/2000 | Rastegar | |
| 6,112,410 A | 9/2000 | Rastegar | |

* cited by examiner

Primary Examiner—F. Daniel Lopez
(74) Attorney, Agent, or Firm—Frommer Lawrence & Haug LLP; William S. Frommer; Dennis M. Smid

(57) ABSTRACT

Apparatus for compensating for positioning, pointing and/or orientation errors caused by deflections of structural members and components of a high performance machine or device and/or for reducing vibration inputs to such machine or device and/or for micro-positioning such machine or device so as to improve the operational performance of such machine or device. The apparatus utilizes one or more active-type actuators, such as piezoelectric ceramic type actuators, which are arranged in a predetermined manner relative to the machine or device. A servo control device operating in accordance with a predetermined algorithm may be utilized for controlling the actuators or, alternatively, the apparatus may operate in an open loop manner.

12 Claims, 18 Drawing Sheets

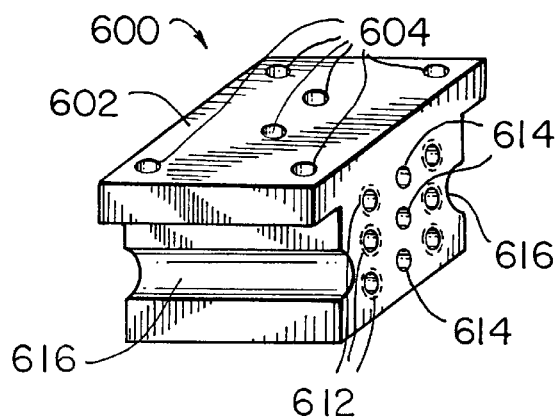
*FIG. 13A*
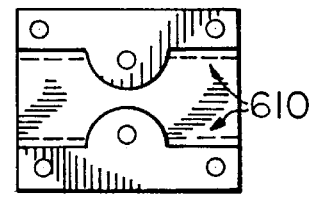
*FIG. 13B*
*FIG. 14*
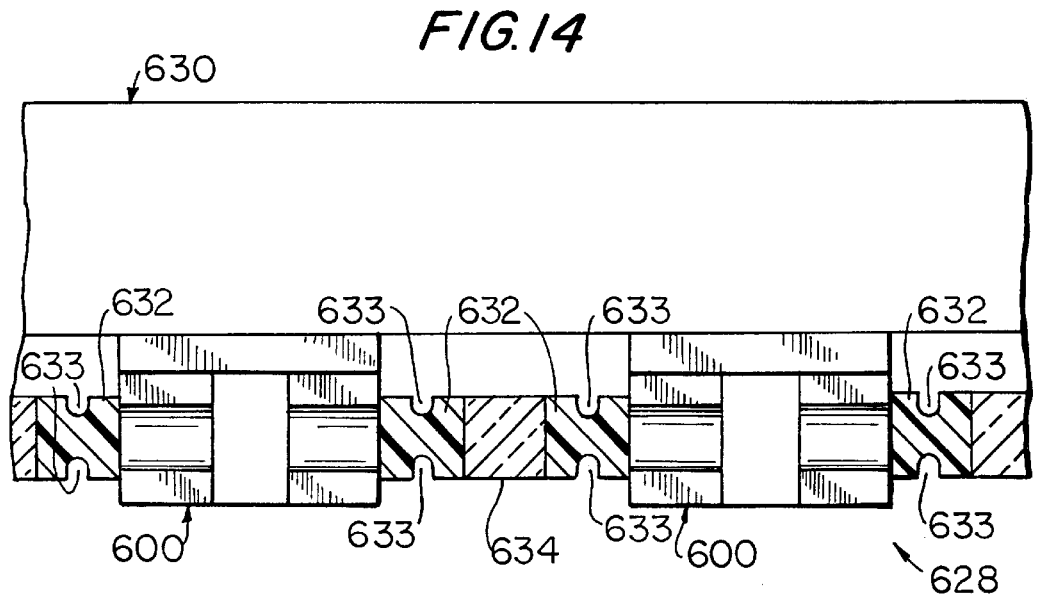

APPARATUS FOR REDUCING VIBRATION INPUTS TO A DEVICE AND/OR FOR MICROPOSITIONING

CROSS REFERENCE TO RELATED APPLICATIONS

This application is a divisional of Ser. No. 09/059,792, filed on Apr. 13, 1998, which is now U.S. Pat. No. 6,154,000, and which is a continuation-in-part of Ser. No. 08/565,906, filed Dec. 1, 1995, which is now U.S. Pat. No. 5,742,145 and which is a divisional application of Ser. No. 08/301,698, filed Sep. 7, 1994, which is now U.S. Pat. No. 5,604,413.

BACKGROUND OF THE INVENTION

This invention relates to an apparatus for improving the operational performance of a machine, device or the like, and, more particularly, to an such apparatus for compensating for positioning, pointing and/or orientation errors caused by defections of structural members and components of a high performance machine or device and/or for reducing vibration inputs to such machine or device and/or for micro-positioning such machine or device so as to improve the operational performance thereof.

Typically, high performance machines, devices, components or the like, may have to perform or maneuver at relatively high speeds and/or accelerations and/or may be subjected to input disturbances. To attain such high speeds and/or accelerations, it is desirable to make these machines light weight. A by product of the weight reduction is the added structural flexibility even though relatively light weight and relatively stiff materials, such as, advanced composites and ceramics are utilized. Such machines or devices may include ultra-high speed and accuracy machine tools, positioning tables, precise pointing devices such as gun barrels, spacecrafts and rotorcrafts, robotic manipulators, cranes, quality control and measurement systems, machinery used in the electronics industry such as probes, lead bonding, laser and x-ray litiography, and so forth, and similar high performance products and computer controlled machines.

When operating at relatively high speeds and/or accelerations, the above-described machines may have structures and/or components that behave as relatively flexible. Such relatively flexible structures may adverse affect the operational performance, that is, the attainable level of operating speed and/or acceleration, and/or positioning accuracy and/or orientation accuracy and/or pointing accuracy of such machines or devices. Further, as a result of such flexibilities, such machines or devices may have vibration, stabilization and control problems which could adversely affect the performance of the machines. Further, insufficient vibration damping may also adversely affect the positioning, pointing or orientation accuracy of such machines or devices by requiring a relatively long settling time for such vibration to "settle out". Therefore, desired or required positioning, pointing or orientation (or tracking) accuracies or settling times may not be achievable, thus resulting in relatively poor operational performance.

As an example, consider the situation in which it is desired to point a gun barrel of a turret weapon system. During aggressive maneuvering and firing, the gun barrel behaves as a relatively flexible beam. Such flexibility can result in structural vibration which ultimately affects the pointing accuracy of the tip of the gun barrel. Although the turret weapon system may have a main actuator(s) for providing movements, such main actuator is not located at the tip of the gun barrel. As a result, the main actuator drives the tip of the gun barrel through the relatively flexible gun barrel, that is, the actuator is non-collocated with the tip of the gun barrel. As a result of such non-collocation and/or non-linearities (such as, stiction, friction, backlash, non-linear elasticity due to drive train, and so forth) between the tip of the gun barrel and the main actuator, it is relatively difficult, if not impossible, to achieve high pointing accuracy. Furthermore, the main actuator may also not have the required bandwidth to correct for the structural modes of vibration particularly those affecting pointing accuracy.

As another example, consider positioning and/or orientation of an end-effector of a robotic manipulator. In this situation, at relatively high operating speeds and/or accelerations, the links between the joint actuator(s) and the end-effector behaves as a flexible member. As such, in this situation, the joint actuator(s) is non-collocated with the end-effector. Similarly, in this situation, the excitation of a structural mode or modes due to the vibration thereof may seriously affect the positioning or orientation accuracy so as to adversely affect the operational performance of the robotic manipulator.

Therefore, as is to be appreciated, it is desirable to compensate for adverse effects of deflections in structural members and components due to the above-described vibration and structural flexibility of such machines, devices or components so as to improve the operational performance thereof. In an attempt to improve such operational performance, various control techniques or systems have been suggested or utilized. However, such control systems normally result in only a limited amount of improvement in the operational performance of the respective machine or device.

Further, high performance machines, devices or the like may be subjected to externally generated vibration (which may be high frequency vibration) which may adversely affect the operational performance of such machines or devices. In an attempt to reduce such vibration, vibration isolation systems have been developed which may reduce the vibration inputs to a machine or device along one direction. However, such vibration isolation systems may not adequately reduce or attenuate vibration inputs if such vibration inputs are along two or more directions. Additionally, such vibration isolation systems may have limited bandwidth.

Thus, the prior art has failed to provide an apparatus for compensating for positioning, pointing and orientation errors caused by deflections of structural members and components of high performance machines or devices and for reducing vibration inputs to a device. As such, the prior art has failed to provide an apparatus for improving the operational performance of high performance machines, devices and components.

OBJECTS AND SUMMARY OF THE INVENTION

An object of the present invention is to provide an apparatus for improving the operational performance of a machine, device or the like which overcomes the problems associated with the prior art.

More specifically, it is an object of the present invention to provide a compensating apparatus coupled to a deflectable member of a machine, device or the like having at least one active-type actuator which is adapted to exert a relatively high corrective moment and/or force and/or torque on the deflectable member so as to compensate for the deflection thereof.

Yet another object of the present invention is to provide a compensating apparatus as aforesaid which is adapted to provide a relatively fast response time.

A still further object of the present invention is to provide a compensating apparatus as aforesaid in which the active-type actuator(s) are at least partially thermally isolated from the deflectable member.

A further object of the present invention is to provide a compensating apparatus having one or more active-type actuators attached to a flexible member at one or more positions to act as a quasi-distributed actuator.

Yet another object of the present invention is to provide a compensating apparatus as aforesaid which may operate in either an open-loop or closed-loop manner.

A still further object of the present invention is to provide an apparatus for reducing vibration inputs to a device in at least two directions.

Yet still another object of the present invention is to provide an apparatus for reducing vibration inputs as aforesaid having at least one module each including a plurality of active-type actuators and adapted to reduce vibration inputs to the device in at least two directions.

Another object of the present invention is to provide an apparatus for reducing vibration inputs as aforesaid in which two or more modules may be easily combined so as to reduce vibration inputs to the device in more than two selected directions.

A yet another object of the present invention is to provide an apparatus for positioning a device having a plurality of modules each including a plurality of active-type actuators.

In accordance with one aspect of the present invention, an apparatus for compensating for deflection of a deflectable member is provided which comprises first and second support members each coupled to the deflectable member, and a plurality of actuator devices each coupled to the first and second support members and arranged at a respective predetermined distance from the deflectable member for exerting a moment on the deflectable member so as to compensate for the deflection of the deflectable member.

In accordance with another aspect of the present invention, an apparatus for compensating for deflection of a deflectable member is provided which comprises a detecting device for detecting at least one of deflection of the deflectable member and a derivative thereof and for producing a detection signal therefrom, a control device for generating a control signal in response to the detection signal, first and second support members each coupled to the deflectable member, and a plurality of actuator devices each coupled to the first and second support members and arranged at a respective predetermined distance from the deflectable member for exerting a moment on the deflectable member in response to the control signal so as to compensate for the deflection of the deflectable member.

In accordance with still another aspect of the present invention, an apparatus for reducing vibration inputs to a device is provided which comprises a detecting device for detecting vibration along at least two directions of the device and for supplying therefrom a vibration signal corresponding to the detected vibration, a control device for generating a control signal in response to the vibration signal, a support member for supporting the device, and a plurality of actuator devices each coupled to the support member for moving the device in response to the control signal so as to reduce the vibration inputs to the device in at least two directions.

In accordance with a still further aspect of the present invention, an apparatus for positioning a device is provided which comprises a plurality of modules each having a support member and a plurality of actuator devices coupled thereto for moving the device in at least one of a translational and rotational direction, the modules being arranged in series with one another so as to move the device in more than one direction so as to position the device.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

FIG. 13A is a perspective view of a support block;

FIG. 13B is a top view of the support block shown in FIG. 13A;

DETAILED DESCRIPTION OF THE PREFERRED EMBODIMENTS

Figures 1A, 1B:
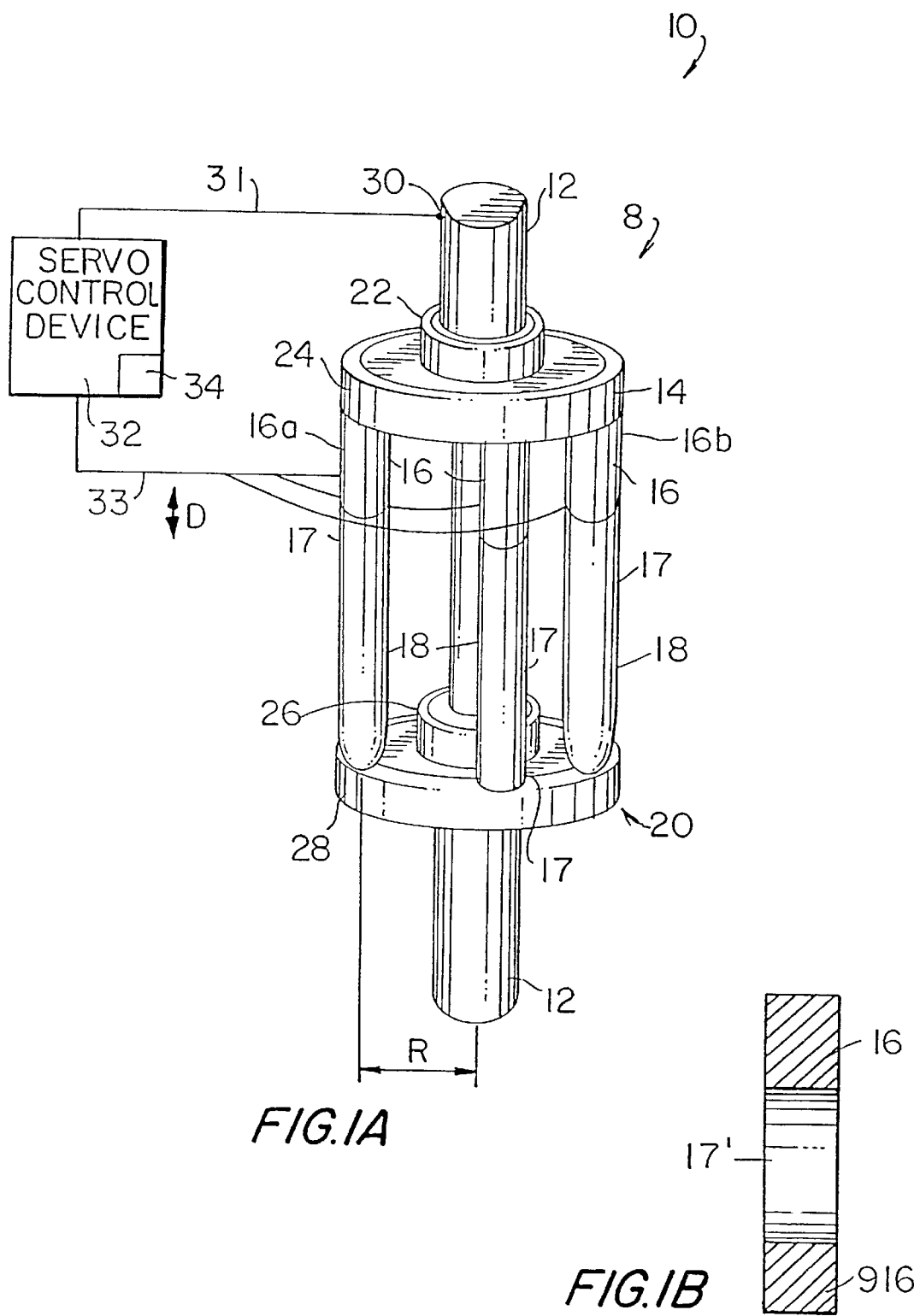
FIG. 1A is a perspective diagram of an apparatus for compensating for deflection of a deflectable member according to an embodiment of the present invention.
FIG. 1B is a diagram of an actuator/support column which may be utilized with the apparatus of FIG. 1A.

An apparatus for compensating for deflection will be initially described below with reference to FIGS. 1–8 and 12. Thereafter, an apparatus for reducing vibration inputs and/or positioning a device will be described with reference to FIGS. 8–11.

FIG. 1 illustrates a compensating apparatus 10 according to an embodiment of the present invention. Such compensating apparatus 10 is adapted to compensate for deflection of a barrel, rod, or beam 12 which, for example, may be a gun barrel of an armored tank, beams utilized as structural members of manipulators or cranes, machine tools, or the like. As shown in FIG. 1, the compensating apparatus 10 generally includes a compensating attachment device 8 and a servo control device 32. The compensating attachment device 8 includes a first attachment disc 14, a second attachment disc 20, a plurality of actuators 16, a plurality of support columns 18, and a deflection detector 30. Each of the first and second attachment discs 14 and 20, respectively, includes inner and outer rings. That is, the first attachment disc 14 includes a first inner ring 22 and a first outer ring 24, and the second attachment disc 20 includes a second inner ring 26 and a second outer ring 28. The first and second inner rings 22 and 26, respectively, are preferably secured to the beam 12.

The actuators 16 are preferably active-type devices each having a piezoelectric ceramic based material, such as, a lead-zirconate-titanate (PZT) based material such as PZT-5H manufactured by Morgan Matroc Inc. Each such piezoelectric ceramic type device includes a movable portion or activating rod 162 (FIG. 5) which, in response to a control signal supplied from the servo control device 32 as hereinafter more fully described, is adapted to move an amount represented by the control signal in a translational direction D, that is, in a direction substantially parallel to the longitudinal axis of the respective actuator. Further, such piezoelectric ceramic type actuators are relatively rigid, have a relatively low weight and a fast dynamic response and are relatively stable. Furthermore, PZT based materials may produce a relatively large output power due to an inherent relatively large electromechanical coupling coefficient. However, such actuators may be relatively brittle and susceptible to fracture failure. As a result, the actuators are preferably preloaded so as to prevent the operation thereof under tensile stress and the actuators are arranged so as to minimize non-axial loading, as hereinafter more fully described.

Polycrystalline ceramics, which are relatively hard and dense, are preferred since the chemical and physical properties associated therewith may be tailored. Further, such polycrystalline ceramics are relatively immune to atmospheric conditions. Furthermore, although the actuators 16 were previously described as having piezoelectric ceramic based material, other types of active materials, such as, Terfornal D, shape memory alloys, electrorheological fluids, polymer biomaterials, magnetorestrictive materials and so forth, may be utilized.

Each of the actuators 16 is respectively coupled to one of the support columns 18. The actuators 16 are further coupled to an outer portion of the first attachment disc 14 such as the first outer ring 24. The support columns 18 are further coupled to an outer portion of the second attachment disc 20, such as the second outer ring 28.

The support columns 18 are adapted to provide the desired axial spacing between the first and second attachment discs 14 and 20, respectively. That is, such desired spacing may be obtained by utilizing different length support columns or by adjusting the length of such support column with shims or similar such devices.

Although the actuators 16 and the support columns 18 are arranged herein as previously described, the present invention is not so limited. That is, the actuators 16 and the support columns 18 may be alternately arranged. For example, all of the actuators 16 may be coupled to the second attachment disc 20, whereupon the support columns 18 are coupled to the first attachment disc 14. As another example, one or more of the actuators 16 may be coupled to the first attachment disc 14 and the remaining actuators coupled to the second attachment disc 20, whereupon the respective support columns 18 are correspondingly coupled to the respective opposite ones of the first and second attachment discs.

Each of the actuators 16 and its respective support column 18 forms an actuator/support column 17 which is located at a distance R from the beam 12 as shown in FIG. 1. Further, each of the actuators/support columns 17 is preferably arranged in the compensating attachment device 8 such that the respective longitudinal axis through the center thereof is substantially parallel to the longitudinal axis through the center of the beam 12.

Although the compensating attachment device 8 shown in FIG. 1 includes four actuators/support columns 17 (although only three are actually shown a fourth is hidden by the beam 12), the present apparatus is not so limited and may include any number of such actuators and support columns. Further, although each of the actuators/support columns 17 include only one actuator, the present invention is not so limited and may include two or more such actuators. Alternatively, each actuator/support column may include more than one type of actuators. For example, as shown in FIG. 1B an actuator/support column 17' may include a piezoelectric ceramic with Terfonal D based actuator 16 and a hydraulic-type actuator 916, in which the piezoelectric ceramic actuator is adapted to compensate for relatively high frequency low amplitude displacements while the hydraulic-type actuator is adapted to compensate for relatively low frequency high amplitude displacements.

The deflection detector or sensor 30 is coupled to the beam 12. Such sensor 30 is adapted to sense the deflection of the beam and to supply a signal indicating such beam deflection, by way of a lead 31, to the servo control device 32. Alternatively, the sensor 30 may sense a derivative of the deflection of the barrel 12. For example, the sensor 30 may sense the velocity or rate of change of the beam deflection (first derivative), the acceleration of the beam (second derivative), the jerk (third derivative) and so forth. Accordingly, such sensors may be accelerometers, strain gages and so forth. Further, although only one sensor is illustrated in the compensating apparatus 10, the present invention is not so limited and more than one sensor may be utilized. Furthermore, the sensor(s) 30 need not be coupled to the beam 12, but may alternatively be coupled to other portions of the compensating attachment device 8 such as the first and second attachment discs 14 and 20.

The above-described PZT based material may generate a voltage due to a strain produced by, for example, tensile or compressive forces. Such property enables a PZT based material device to function as both an actuator and a sensor. As a result, the sensor(s) 30 may be omitted and, in place thereof, one or more of the actuators may be utilized to sense the deflection (or a derivative thereof) of the beam 12 and to supply a signal indicating such deflection (or derivative) to the servo control device 32.

The servo control device 32 is adapted to receive an output signal from the sensor 30 and, in response thereto, to provide a control signal(s) to the appropriate one or ones of the actuators 16. More specifically, the servo control device 32 may include a processing device 34 which processes the received signal in accordance with a predetermined algorithm, which may be stored within a memory (not shown) included in the servo control device. The processed signal from the processing device 34 is utilized to form the control signal or signals which are supplied, by way of leads 33, to the one or ones of the actuators 16 which preferably most effectively counteracts the detected deflection. The servo control device 32 could be constructed so as to operate in either a digital or analog manner. As is to be appreciated, if the amount of computations is relatively large or if such computations are relatively complex, then it may be preferred for the servo control device 32 to operate in a digital manner.

Figure 12:
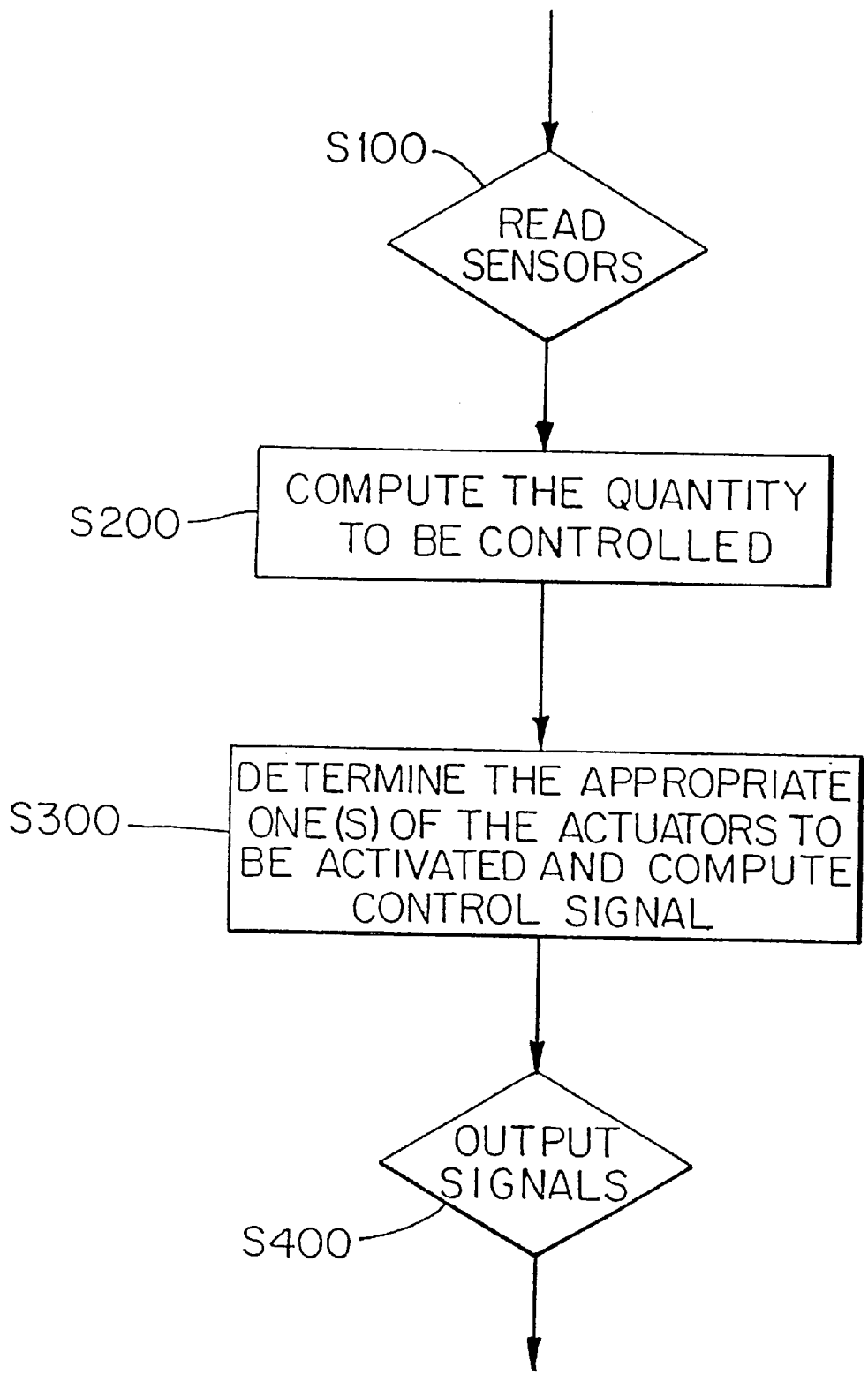
FIG. 12 is a flow diagram to which reference will be made in describing an algorithm which may be utilized by an apparatus of the present invention.

The above-mentioned predetermined algorithm may operate as illustrated in FIG. 12. More specifically, as shown therein, signals from the sensor or sensors are read at step S100. Alternatively, if a piezoelectric ceramic-type actuator is used as a sensor(s), then signals from such actuator(s) are read. Thereafter, processing proceeds to step S200 in which the quantity to be controlled is computed or determined from the signals of the sensor(s). For example, the orientation or acceleration of the end or tip of a gun or beam may be computed, the position of the end or tip of the beam, and the derivatives thereof. Processing then proceeds to step S300 in which the appropriate one(s) of the actuators to be activated is determined and in which the computed quantity to be controlled is utilized to compute or generate the appropriate control signal or signals. In such computation, a previous control signal(s) and/or previous sensor data (i.e., historical data) may be utilized to formulate the current control signal. Further, such computation may be performed in an adaptive-type manner. For example, for vibration damping in a beam, the control system usually provides an actuating moment which is 180 degrees out-of-phase with the beam vibrations. As is to be appreciated, this phase shift may be achieved in numerous ways. Thereafter, processing proceeds to step S400 whereat the generated control signal(s) are supplied to the appropriate one or ones of the actuators.

Figure 2:
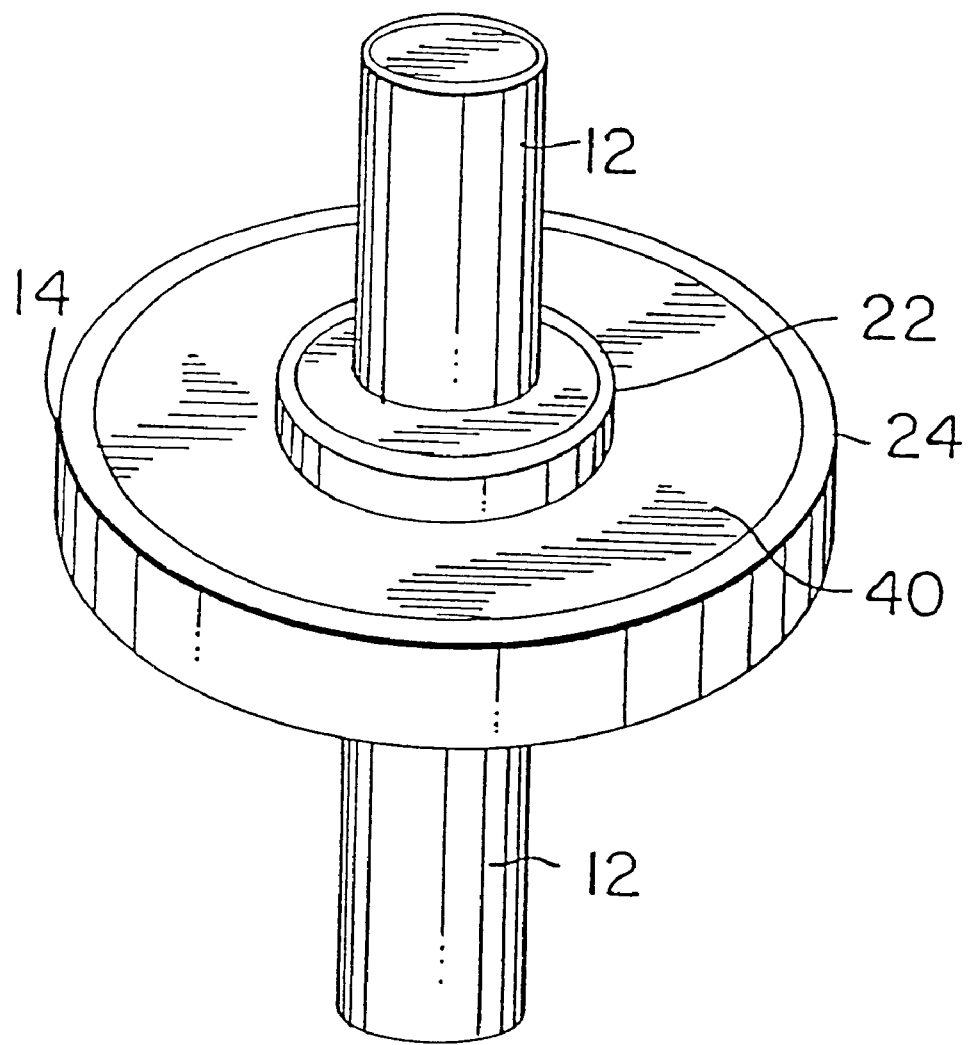
FIG. 2 is a perspective diagram of a portion of the apparatus of FIG. 1.
Figure 3:
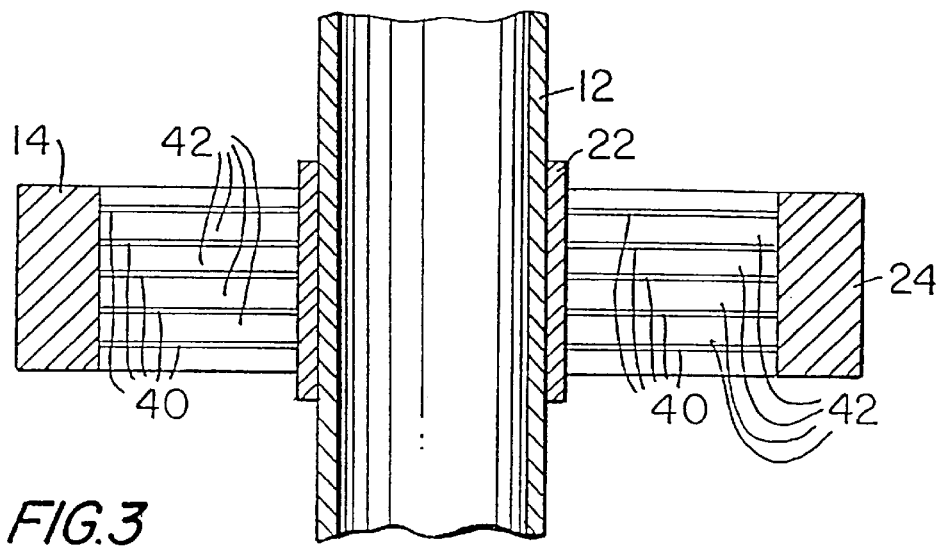
FIG. 3 is a cross-sectional view of the portion of the apparatus of FIG. 2.

At least one of the first and second attachment discs 14 and 20, respectively, may include one or more disc plates 40 as illustrated in FIGS. 2 and 3. That is, such attachment disc(s) may include the corresponding inner and outer rings, which are formed of a rigid type material, and may further include at least one, and preferably at least two, disc plates 40 connected therebetween. Such disc plate 40 may be constructed from a relatively thin steel, or appropriate spring-like material, and may be formed so as to have a disc-like shape. Alternatively, the disc plate or connecting member 40 may be configured or formed of a plurality of beams 102 each arranged in a radial manner as, for example, shown in FIG. 4A. Further, such attachment disc(s) may have layers 42 of heat resistant and/or high damping material arranged between one or more adjacent ones of the disc plates as shown, for example, in FIG. 3 and as more fully described hereinafter.

The placement or positioning of the compensating attachment device 8 of the compensating apparatus 10, that is, the first and second attachment discs 14 and 20, the actuators 16 and the support columns 18, may depend upon a number of considerations. For example, such placement may depend on the space available and/or the vibrational modes to be damped. Further, more than one compensating attachment device 8 or compensating apparatus 10 may be coupled to the beam 12, or similar member, each located so as to counteract a vibrational mode of the beam 12. Alternatively, a plurality of compensating attachment devices 8 may be stacked together on the beam 12 in a multi-stage arrangement. In such stacked or multi-stage arrangement, adjacent compensating attachment devices may have a common attachment disc. Additionally, since not all of the vibrational modes may have an appreciable effect on the operational performance or pointing inaccuracies (e.g., the barrel rotation relative to the undeformed longitudinal axis of the gun barrel) of the system or device, the compensating attachment device 8 may be located so as to transfer or spill over the modal energy from one mode to that of another.

Figure 5:
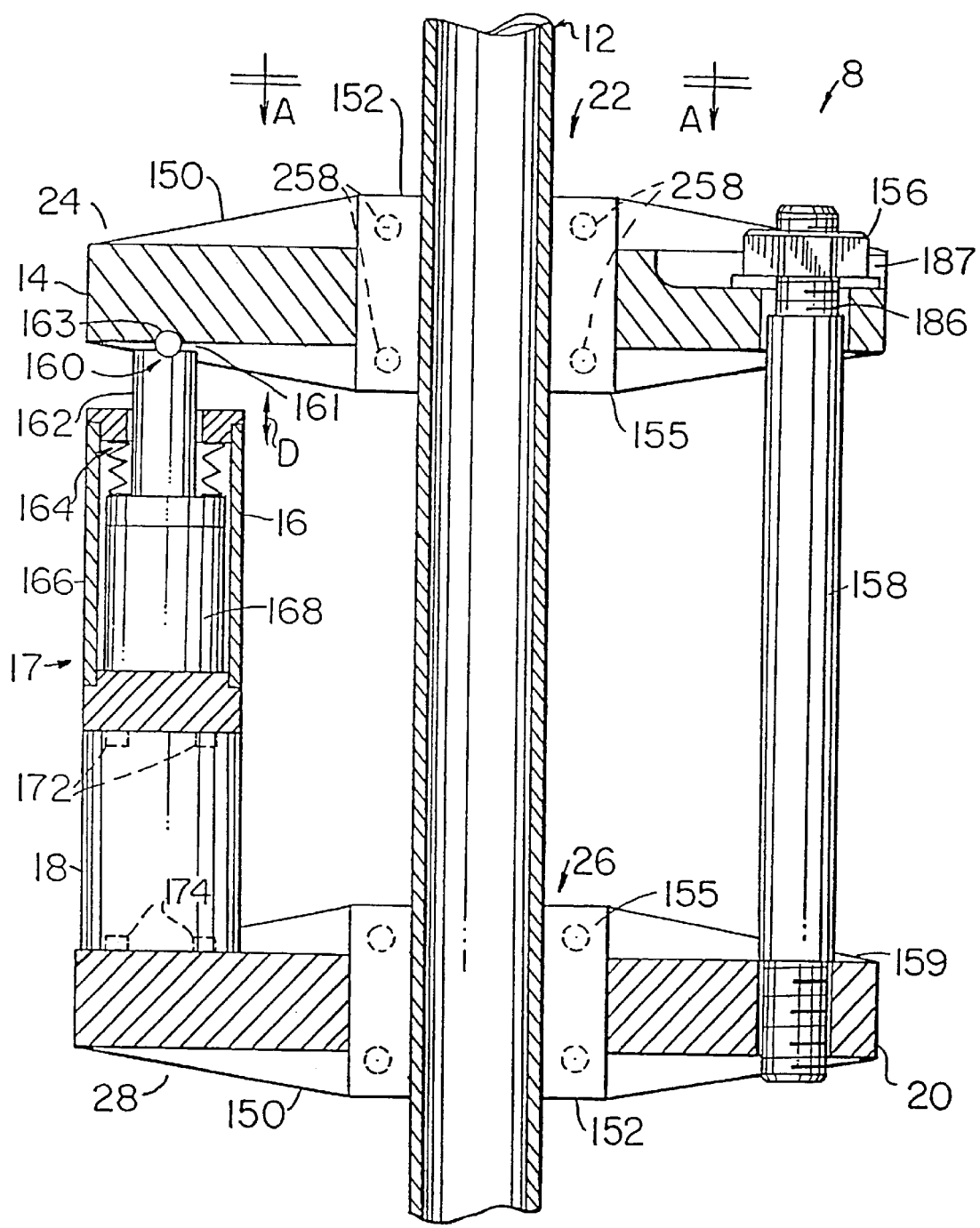
FIG. 5 is a cross-sectional view of the apparatus of FIG. 1 having a modification thereto taken along lines B—B of FIG. 6 and to which reference will be made in explaining the installation of such apparatus.
Figure 6:
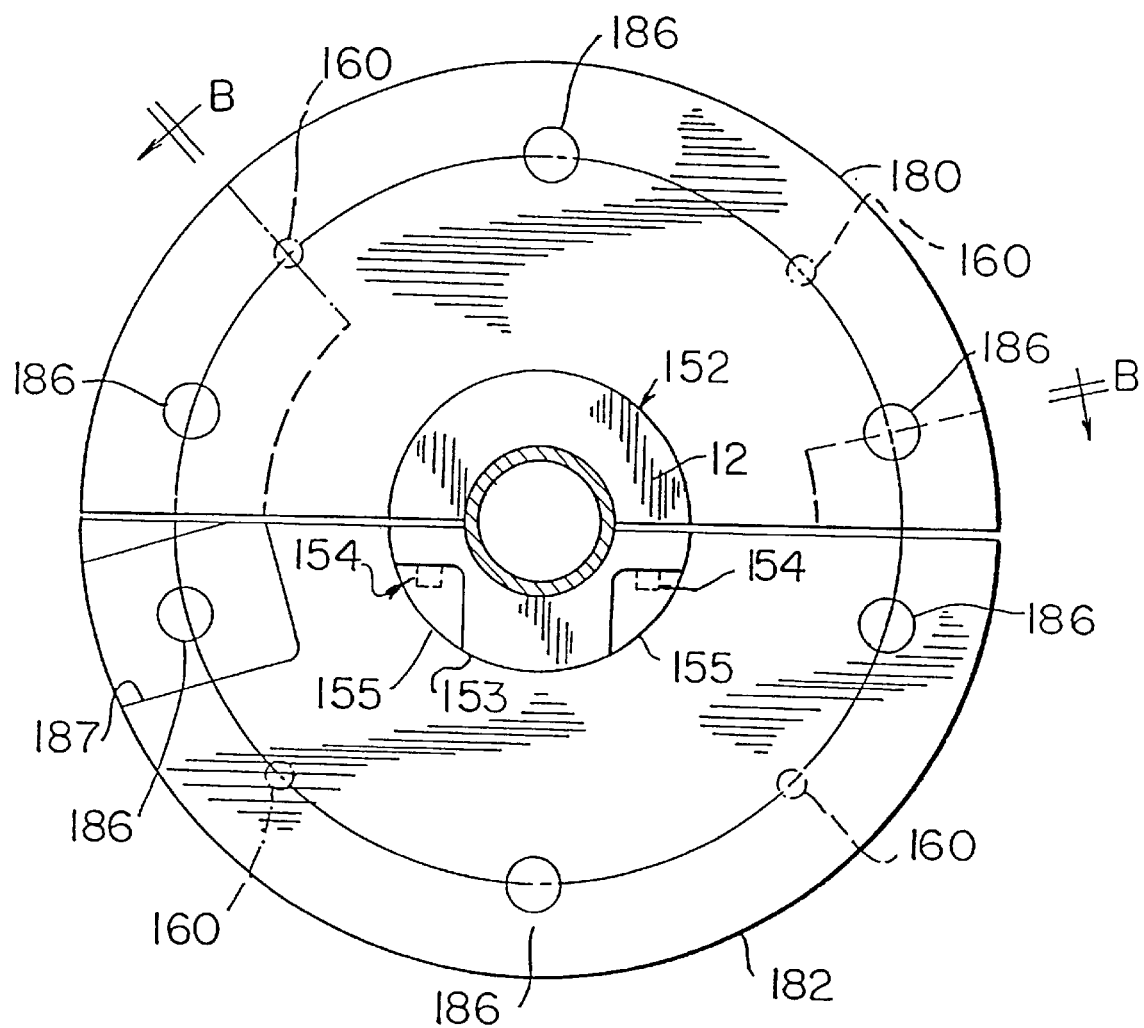
FIG. 6 is a top view of the apparatus of FIG. 1 as viewed from A—A of FIG. 5 without stiffening webs.

FIGS. 5 and 6 illustrate the compensating attachment device 8 and one of the actuators 16 in greater detail. FIG. 5 further illustrates a device for preloading the actuators.

As shown in FIG. 5, the compensating attachment device 8 generally includes first and second attachment discs 14 and 20, friction collars or inner rings 22 and 26, actuator/support column 17 which includes the actuator 16 and the support column 18, and a spherical joint 160. The first and second attachment discs 14 and 20 may include stiffening webs 150 which are generally arranged between an outer portion of the discs and the friction collars. Such stiffening webs, which may be arranged or configured in a manner well known in the art, are adapted to provide a desired amount of stiffness to the first and second attachment discs 14 and 20. The friction collars 22 and 26 are used to couple the respective attachment discs to the beam 12 as hereinafter more fully described.

Each actuator 16 is connected, by use of attachment screws 172, to the support column 18 which, in turn, is connected to the second outer ring 28 of the second attachment disc 20 by use of attachment screws 174. The actuating rod 162 of the actuator 16 is coupled to the first outer ring 24 by the spherical joint 160. As a result, the outer rings of the compensating attachment device are coupled together by the actuator/support column 17. Further, although only one actuator/support column 17 is shown in FIG. 5, the present invention is not so limited and as shown in FIG. 1 more than one such actuator/support column and preferably at least three such actuator/support columns may be utilized.

Each actuator 16 includes the actuating rod 162, preloading springs 164, and a piezo actuator stack or material 168 arranged within an actuator casing 166 as shown in FIG. 5. In operation, each actuator 16 is preloaded by use of the preloading springs 164 and therefore are in compression. Upon being activated, such as by applying a voltage signal thereto, the piezo actuator stack 168 will move up or down along the D direction.

As previously described, the actuators may be preloaded. Such preloading may be accomplished by use of preloading and holding rods 158 and preloading nuts 156 as illustrated in FIGS. 5 and 6. More specifically, one end of each of the preloading and holding rods 158 is respectively threaded into one of threaded holes 159 of the second attachment disc 20, and the other end of each of the preloading and holding rods is inserted into one of through holes 186 located in a respective recess 187 and the preloading nuts 156 are threaded onto such end of the rods 158. By tightening the preloading nuts 156, the spacing between the first and second attachment discs 14 and 20 is reduced, thereby moving the actuating rods 162 further into the actuator casings 166 and preloading the piezo stack actuators 168 of the actuators 16. By selectively tightening the preloading nuts 156, the piezo stack actuators 168 may be preloaded to a desired amount. Although only one preloading and holding rod 158 and preloading nut 156 are shown in FIG. 5, more than one such devices may be utilized in preloading the actuators as, for example, indicated by the arrangement of holes 186 for the preloading and holding rods and the preloading nuts as shown in FIG. 6, which illustrates a view A—A of the compensating attachment device 8 without the stiffening webs 150.

As is to be appreciated, upon preloading the actuators 16 as previously described, the preloading and holding rods 158 and the preloading nuts 156 are removed from the compensating attachment device 8.

Further, as previously described, the piezoelectric ceramic type actuators 16 are preferably arranged so as to minimize or prevent non-axial loading or bending loading thereon. More specifically, the actuators 16 may be coupled to the first attachment disc 14 by way of the spherical joint 160, which may be of a ball and socket type. Such ball and socket arrangement may include a ball 161 coupled to the upper portion of the actuating rod 162 and a socket or mating member 163 arranged in the lower surface of the first outer ring 24 of the first attachment disc 14. In such arrangement, the ball 161 is inserted within the socket 163 so as to pivotably support the ball and the members attached thereto. Alternatively, the spherical joint 160 may be a flexure joint which permits a desired rotational range with minimal resistance or other similar such devices.

The operation of the compensating apparatus 10 will now be described.

Upon a deflection of the beam 12, such as due to the firing of the gun barrel or an external disturbance or the like, the sensor 30 detects such deflection or a derivative thereof and supplies a signal corresponding thereto to the servo control device 32 by way of the leads 31. The processing device 34 of the servo control device 32 processes the received signal in accordance with the algorithm previously stored in the memory thereof and, as a result, the servo control device generates a control signal which is supplied by way of the leads 33 to the appropriate one or ones of the actuators 16.

As an example, suppose that the beam 12 has deflected to the left (as viewed facing FIG. 1). In this situation, the sensor 30 detects such deflection or a derivative thereof and supplies a corresponding signal to the servo control device 32, whereupon a corresponding control signal is generated and supplied therefrom. Since the beam 12 has deflected to the left, the control signal only activates actuator 16a so as to elongate the same. Alternatively, a control signal may be supplied to actuator 16a so as to elongate the same and to actuator 16b so as to shorten the same. As a result, the movable portion or actuating rod 162 (FIG. 5) of the actuators 16a and/or 16b moves an amount corresponding to the detected beam deflection (or a derivative thereof) and its history and/or the history of the control signals in a direction D which is substantially parallel to the longitudinal axes of the actuators 16a and 16b (and to the longitudinal axis of the beam 12) so as to cause a force to be exerted on the corresponding portion of the first and second attachment discs 14 and 20. Such force causes a moment equal to a product of the force and the distance R (i.e., force ×distance R), to be exerted on the beam 12. (As is to be appreciated, depending upon the configuration, a force or a torque may be applied.) As a result, the beam 12 is moved in a direction substantially opposite to that of the deflection so as to compensate for such deflection and return the beam to its original position and/or point a tip of the beam to its undeformed direction, such as in the case of a gun barrel.

In the above-described example, since the compensating apparatus 10 includes four actuators 16, only either actuator 16a and/or actuator 16b is activated to compensate for the deflection of the beam 12 to the left. However, as is to be appreciated, if the compensating apparatus 10 includes a different number of actuators or if the deflection of the beam 12 is in a direction which may not be readily compensated by only either actuators 16a and/or 16b or if the actuators are arranged differently from that shown in FIG. 1, then a different combination of actuators may be activated to compensate for such deflection.

To activate the appropriate one or ones of the actuators 16, a respective control signal may only be supplied to each of the desired actuators. In this situation, the actuators not receiving a respective control signal are not activated. Alternatively, the control signal may be supplied to each of the actuators, that is, both the actuators desired to be activated and those not so desired. However, in this latter situation, the control signal identifies the desired actuator or actuators. For example, the control signal may contain an identification code which identifies the desired actuator(s). In this situation, each actuator has a respective identification code associated therewith and includes a device (not shown) for decoding the coded control signal and determining if the decoded identification code included therein matches that of the respective actuator whereupon, if a match is determined, the control signal is passed to the respective actuator so as to activate the same, and if a non-match condition exists, the control signal is not passed to the respective actuator and accordingly such actuator is not activated.

As is to be appreciated, if the beam 12 is vibrating, for example, in a periodic motion, the compensating apparatus 10 is adapted to counteract or compensate for such vibration in a manner similar to that described above. That is, the compensating apparatus 10 and, in particular, the actuators 16 and the servo control device 32, have a relatively fast response time. As a result, the compensating apparatus 10 permits a counteraction or compensation of the beam 12 to periodically occur. Alternatively, the compensating apparatus 10 may continuously compensate for the deflections of the beam 12.

In a similar manner, the piezo stacks 168 of the actuators 16 may be activated to achieve positioning or pointing of the beam 12. As an example, during the firing of a gun, the compensating attachment device(s) may be arranged on the gun barrel and controlled so as to enable the gun barrel to be pointed in a desired direction at the time of firing such gun.

Figure 4A:
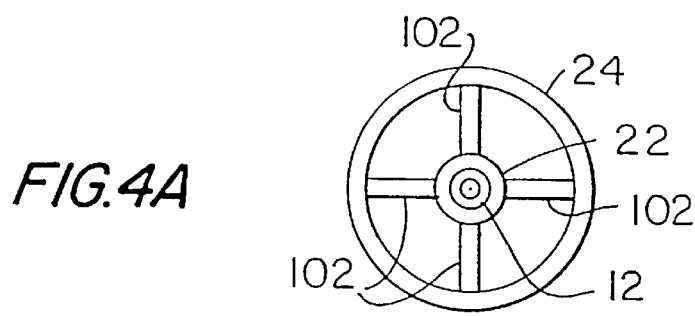
FIG. 4A is a diagram of an alternative connecting member utilized in an attachment disc of the portion of the apparatus of FIG. 3.
Figure 4B:
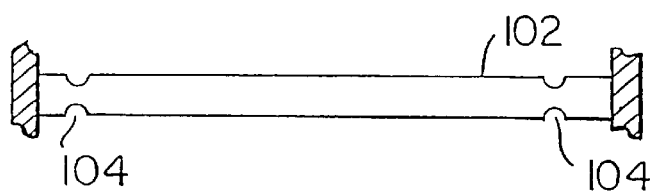
FIG. 4B is a diagram of a beam which may be utilized in the connecting member of FIG. 4A.

As previously described, at least one of the first and second attachment discs 14 and 20 may include the disc plates 40 (FIG. 3) having a disc or beam shape and constructed of relatively thin steel. Such arrangement may minimize adverse effects from movement of the beam 12, such as may occur in the case of a gun barrel in which the thermal effects caused by the firing of the gun may cause the gun barrel to move axially in a cyclic manner. More specifically, as shown in FIG. 3 and as previously described, the inner ring 22 is rigidly attached to the beam 12. During movement of the beam 12 which may occur during thermal expansion thereof, the inner ring 22 can move a relatively small amount in the longitudinal direction of the beam 12 relative to the outer ring 24 without a significant amount of resistance from the disc plates 40. Such axial displacement of the inner ring 22 relative to the outer ring 24 may occur since the disc plates 40 are merely subjected to bending loads to which they offer relatively small resistance Although the attachment disc illustrated in FIG. 3 may permit axial displacement of the inner ring 22 as previously described, such disc provides a relatively high resistance to movements which may occur in performing the compensating operation. Such movements may include rotations of the inner ring 22 relative to the outer ring 24 about axes which are perpendicular to the longitudinal axis of the beam 12. These rotations may cause radial displacements in the disc plates 40 (or axial displacements in the beams 102 if beams are used as the plates 40) to which the disc plates (beams) offer a relatively high resistance. If additional axial compliance is desired, beam members 102 having narrow end portions 104 as shown in FIG. 4B may be utilized.

Further, the positioning of the actuators 16 at a distance R (FIG. 1), reduces or minimizes the heat transfer from the beam 12 to the actuators. As is to be appreciated, the beam 12, which may be a gun barrel as previously described, may reach relatively high temperatures as for example during a firing operation. However, the distance from the beam 12 to the actuator 16, along with the heat resistant material 42 of the attachment disc, provides a relatively high thermal resistance which reduces the heat transfer from the beam 12 to the actuators. As a result, the actuators 16, which as previously described may be the piezoelectric ceramic-type actuators whose performance may be adversely affected by exposure to relatively high temperatures, are at least partially thermally isolated from the beam 12 and accordingly may not be exposed to such relatively high temperatures. Accordingly, the performance of the actuators 16 may not be adversely affected. When required, additional radiational thermal resistance can be provided in the form of radiation shields between the beam and the actuators (e.g., such shields may be mirrored-like surface plates such as polished aluminum).

Furthermore, the arrangement of the attachment disc of FIG. 3 having the damping material as previously described, reduces vibration of the beam 12 so as to act as a passive damper. Further, such arrangement reduces the vibration of flexible discs or beam elements of the attachment discs and increases its resonant frequency.

The disc plates 40 (FIGS. 2 and 3) and beams 102 (FIGS. 4A and 4B) are preferably designed so as to minimize buckling of such disc plates and beams. Such design techniques are well known and, as such, will not be described herein.

The compensating attachment device 8 may be configured to enable easy attachment to and removal from the beam 12. For example, each compensating attachment device 8 may include more than one section or portions, such as the two portions 180 and 182 as shown in FIG. 6. More specifically, the portions 180 and 182 respectively include friction collar portions 152 and 153 which form the respective inner ring and which are arranged around the beam 12 and secured thereto by use of a plurality of collar bolts 154. That is, the collar bolts 154 are inserted through clearance holes (not shown) located in the friction collar portion 153 adjacent to recess portions 155 into threaded holes 258 (FIG. 5) in the friction collar portion 152. Further, grooved sleeves may be utilized to provide an accurate and rigid mounting of the compensating attachment device to the beam 12. Alternatively, the compensating attachment device may be secured by friction and/or through adhesives and/or brazing and/or welding and the like when the anticipated vibration levels and frequency permits.

Figure 7:
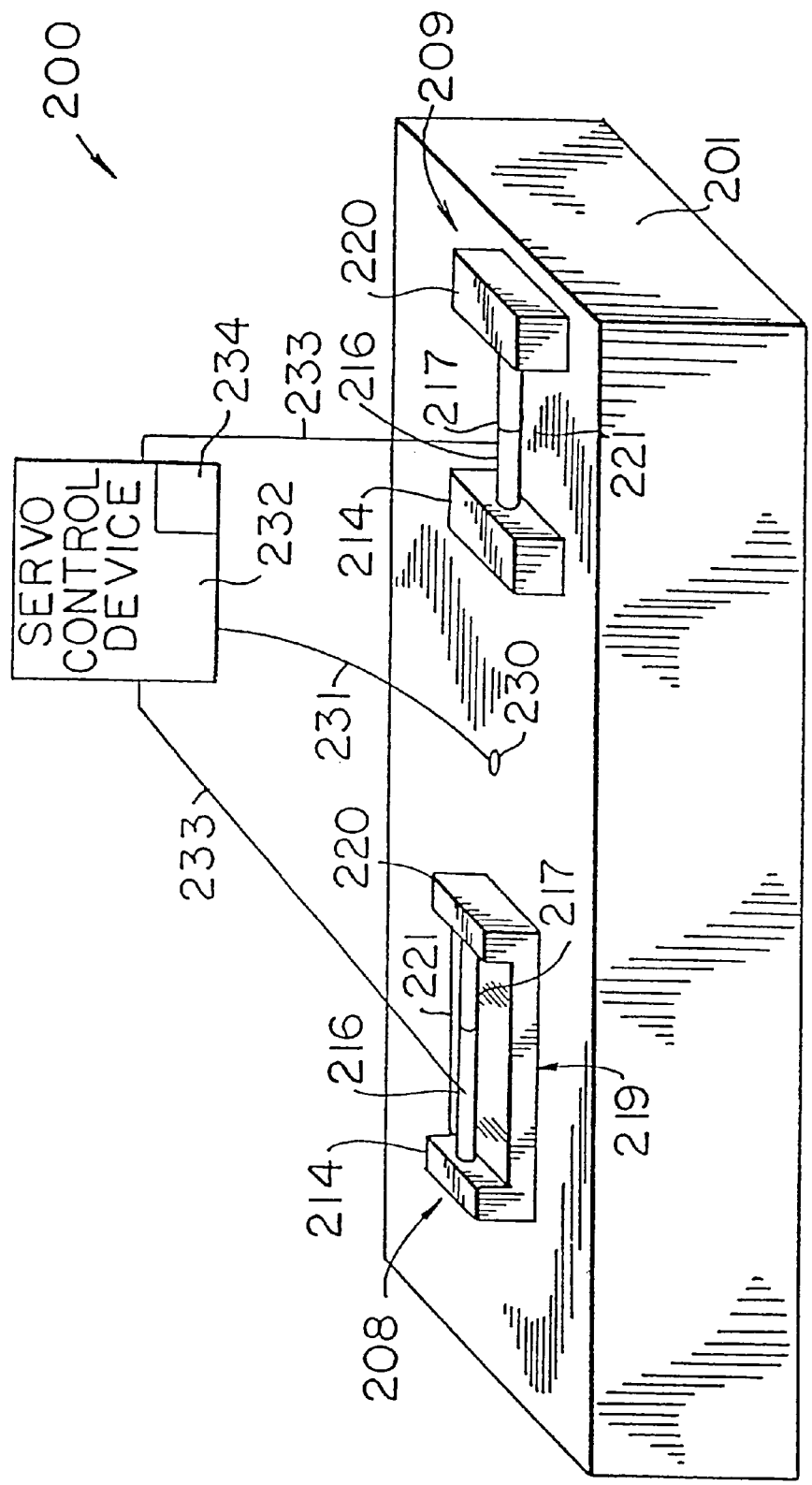
FIG. 7 is a perspective view illustrating an apparatus for compensating for deflection of a deflectable member in accordance with another embodiment of the present invention.

In addition to compensating for the deflections of a barrel or beam, the present invention may be utilized for compensating for the deflections of other shaped or types of members, such as a beam or column 201 by utilizing a compensating apparatus 200 as illustrated in FIG. 7. As shown therein, the compensating apparatus 200 generally includes one or more compensating attachment devices 208 and/or 209 and a servo control device 232. The compensating attachment devices 208 and 209 may be coupled to the beam 200 by use of screws, rivets, and the like (not shown) or alternatively may be welded, bonded or similarly secured thereto. The compensating attachment device 208 includes a first end member 214, a middle or intermediate member 219, and a second end member 220 which are secured together and arranged in a U-shape manner as shown in FIG. 7. An actuator 216, which may be similar to the actuator 16, is coupled to a support member 217 which, in turn, may be similar to support column 18. The actuator 216 and the support member 217 form an actuator/support member 221 which is arranged between the first and second end members 214 and 220, respectively. The compensating attachment device 209 is substantially similar to the compensating attachment device 208 except that the device 209 does not include the middle member 219. The servo control device includes a processing device 234 and is adapted to receive a signal corresponding to a deflection or the resulting positioning or pointing error of the beam 201 or a derivative thereof from a sensor(s) 230 by way of a lead(s) 231 and process such received signal so as to produce a control signal which is supplied to the appropriate one or ones of the actuators 216 by way of leads 233. Such operation of the servo control device 232 is substantially similar to that of the servo control device 32 and, accordingly will not be further described herein.

Thus, upon deflection or vibration of the beam 201, the appropriate one(s) of the actuators 216 are activated which causes a force to be exerted on the respective one(s) of the first and second end plates 214 and 220, respectively. As a result, a moment is exerted on the beam 201 which counteracts or compensates for the deflection or motion of the beam 201.

As previously described, the compensating apparatus 200 may include one or more compensating attachment devices (such as one or more of either compensating devices 208 or 209). Further, such compensating attachment devices may be arranged in one or more groups (with any number of such compensating attachment devices being in each group) in any desired manner. Furthermore, such devices may be arranged so as to transfer modal energy from one vibration mode to another, or alternatively to damp the energy of a selected number of such modes. Since not all of the vibration modes may have a significant contribution to the motion of the beam or the resulting inaccuracies caused thereby, the compensating attachment device(s) may be located on the beam 201 so as to counteract a desired one or ones of vibration modes.

Figure 8:
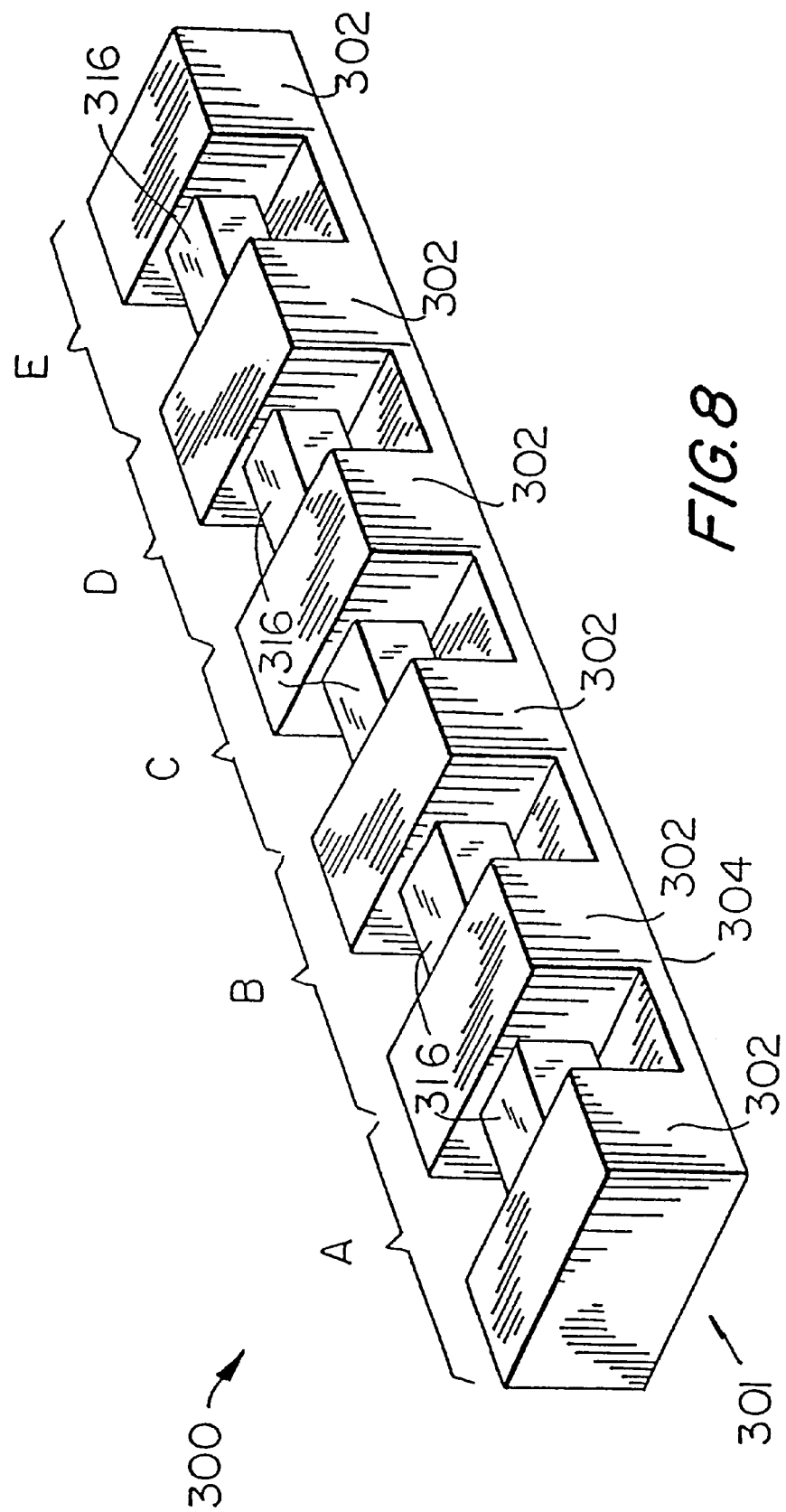
FIG. 8 is a perspective view illustrating an apparatus for compensating for deflection of a deflectable member in accordance with another embodiment of the present invention.

Furthermore, a plurality of compensating attachment devices may be coupled together in a series manner on the beam 201. Alternatively, a multi-stage compensating apparatus 300 as shown in FIG. 8 may be utilized. Such compensating apparatus 300 includes a supporting member 301 having a plurality of supporting ends 302 and a base member 304, and a plurality of actuators 316 arranged between adjacent ones of the supporting ends. Each such actuator and its respective supporting ends forms a single stage, such as one of stages A, B, . . . and so forth. The compensating apparatus 300 is secured to the beam 201 (FIG. 7), or other member, by use of adhesive, screws, rivots or the like and acts as a quasi-distributed actuator for the beam member. In this situation, the deflection (and/or orientation and/or pointing and/or positioning and/or derivatives thereof) of the beam is sensed by utilizing at least one sensor and, preferably, at least one sensor for each actuator is utilized. Such sensing may be accomplished by measuring the change in length or strain of the respective actuator and/or force and/or a strain at the base member 304 or force at the support ends 302 of the actuator 316. Further, such sensors may be placed at any desired locations. A quasi-distributed actuator and sensor is then obtained. Although not shown in FIG. 8, the actuators may be coupled to and controlled by a servo control device such as the servo control device 32 or 232. Accordingly, as a result of a detected deflection or derivative thereof, the appropriate one(s) of the actuators 316 may be activated so as to cause a force to be exerted on the corresponding supporting ends which causes a moment to be exerted on the beam thereby counteracting or compensating for the deflection of the beam in a manner similar to that previously described with reference to the compensating apparatus 200. Further, more than one multi-stage compensating apparatus 300 may be utilized on the beam 12. Each of such multi-stage compensating apparatus may have any number of stages.

Another compensating apparatus and a technique for preloading the same will now be described.

A support block 600 is shown in FIGS. 13A and 13B. Such support may be formed or machined from a solid block so as to have a number of attachment holes 604, a base 602 having a mounting surface which is relatively flat, a number of recesses 610 each providing access to an attachment hole and also reducing the weight of the support block, a number (such as two) of rail recesses or guideways 616 each having a circular arc cross section (although other shapes may be utilized) and located on a side of the block and which may run along the length of such side, and a number of pairs of tapped holes 612 located on the ends of the block which may be arranged in a manner so as to be parallel to the mounting surface of the base 602 and which are provided for attaching a flexure element or elements 632 (FIG. 14) to one or more ends of the support block. The support block 600, and in particular the mounting surface thereof, may be attached to an actuated beam or device 630 (FIG. 14) by use of attachment screws (not shown) through the holes 604. Flexure elements 632 and actuating piezoceramic elements or stacks 634 which may be coupled to the flexure elements as shown in FIG. 14 may be attached at a desired distance from the mounting surface of the base 600 by use of the tapped holes 612 depending on the stiffness of the actuated beam 630 and the bending moment levels that are desired to be achieved. The support block 600 may further have a number of positioning holes 614 located on the ends thereof which may respectively correspond to the level or height of each pair of tapped holes 612. Such positioning holes may be adapted to receive positioning pins for accurately locating and holding the flexure elements 632 to the support block 600 and for resisting shearing displacement.

A compensating apparatus 628 may be arranged as illustrated in FIG. 14. As shown therein, such apparatus may include a number of support blocks 600 each attached to the beam 630 by use of attachment screws supplied through the attachment holes 604, a number of flexure elements 632 each attached to an end of a support block, and a number of piezoceramic stacks 634 each coupled to one or more of the flexure elements. Such apparatus 628 may be assembled and/or preloaded by use of an assembly apparatus as hereinbelow described with reference to FIGS. 15 and 16.

Figure 15:
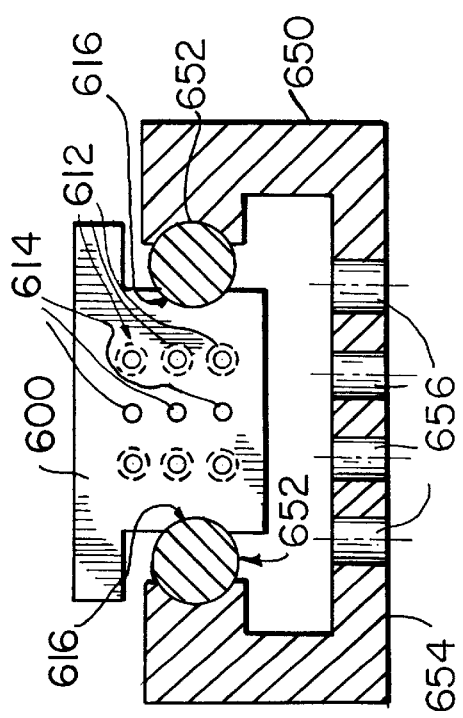
FIGS. 15 and 16 are diagrams of an assembly apparatus.
Figure 16:
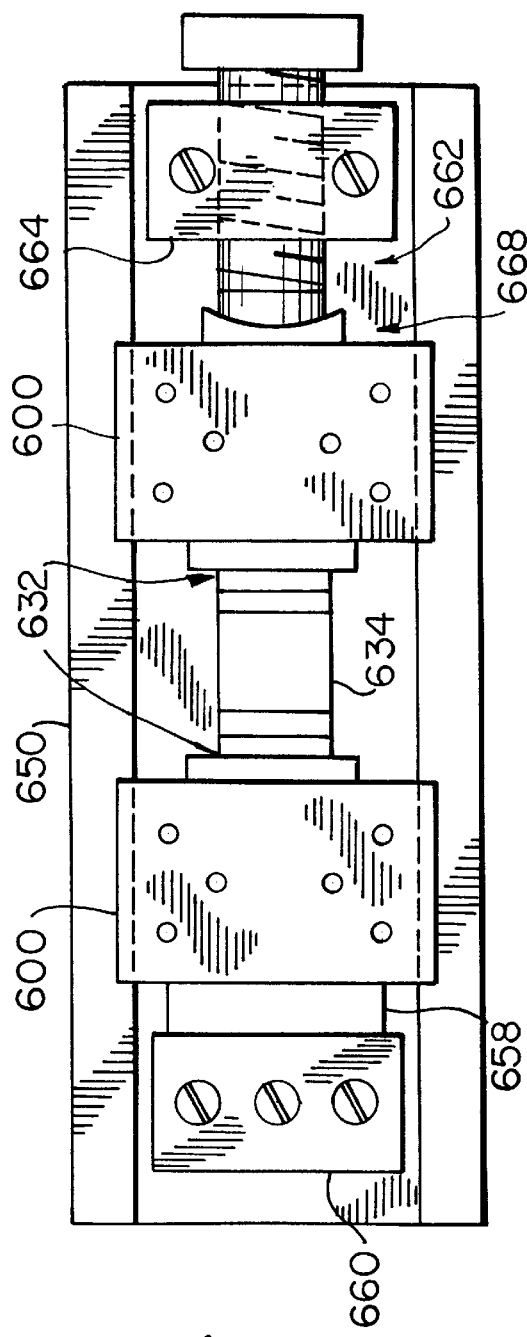

As shown in FIGS. 15 and 16, the assembly apparatus may include a U-shaped rail and preloading mechanism 650 to which two round (or partially round) rails 652 may be rigidly attached. The U-shaped rail and preloading mechanism 650 is preferably constructed with detachable sides from a base 654 thereof so that the rail and preloading mechanism may be adjusted to accommodate a respective support block. An assembly operation may be performed as described below.

An end support block 660 may be bolted centrally inside the channel to which an axial load cell 658 may be attached. The appropriate number of support blocks 600 with a set of two flexure elements 632 and a piezoceramic stack 634 therebetween may be placed between the rails 652 such that the rails run in or along the rail recesses 616. The piezoceramic stacks 634 are preferably glued to the flexure elements 632 and are screwed loosely to the support blocks. Tapped holes may be provided along the base of the U-shaped channel to accommodate a number of support blocks. Once the support blocks 600, the flexure elements 632 and piezoceramic stacks 634 are in place, a support 664 for holding a preloading screw 662 may be bolted down to the base of the U-shaped channel and the preloading screw may be inserted into the support 664. The support block adjacent of the preloading screw 662 may have a ball and socket end 668 located in a center of one end. The assembly may be preloaded to a desired level by turning the preloading screw 662 while reading an output load from the axial load cell 658. Upon preloading the assembly, the screws may be tightened whereupon the assembly may be mounted to the beam 620. Such mounting may be performed as described below.

The base(s) of the support block(s) 600 are positioned over the beam 630, as shown in FIG. 14, so as to align the alignment holes 604 with tapped holes (not shown) in the beam. The base 654 of the U-shaped rail and preloading mechanism 650 may have clearance holes 656 for providing access to attachment screws which may be placed through the attachment holes 604 into the tapped holes in the beam so as to attach the support block(s) to the beam. Upon attaching the support blocks 600 to the beam 630, the preloading screw 662 (FIG. 16) may be loosened and the end support block 660 and/or the preloading block or support 664 may be detached from the U-shaped channel, whereupon the rail assembly may be removed from the support blocks. Any attachment screws (if any) which could not be accessed with the U-shaped rail and preloading mechanism 650 in place may now be properly positioned and tightened.

The flexure elements 632 may be configured to be relatively stiff in directions but that corresponding to the bending of the beam 630. As such, the flexure elements may act as joints that minimally resist the bending of the beam 630 and distribute the axial load over the piezoceramic stack or stacks more uniformly. If the actuated beam has a substantial bending displacement in the direction perpendicular to the actuated bending, then one or more of the flexure elements 632 may have flexural cuts 633 (as shown in FIG. 14) to minimize their resistance to bending in both directions.

The aforementioned apparatus may be varied or modified in a number of ways depending on the stiffness of the actuated beam and its inertia, the size of the load on the beam, the amplitudes of the beam modes of vibration, and so forth. For example, more than one flexure element/ piezoceramic stack(s) assembly may be mounted between a pair of support blocks 600, at least one of the support blocks 600 may be an integral part of the actuated beam (device) 630, and/or one or more of the piezoceramic stacks may be preloaded differently from other piezoceramic stacks by preloading each piezoceramic stack/support block(s) grouping while being attached to the actuated beam.

Figure 17A:
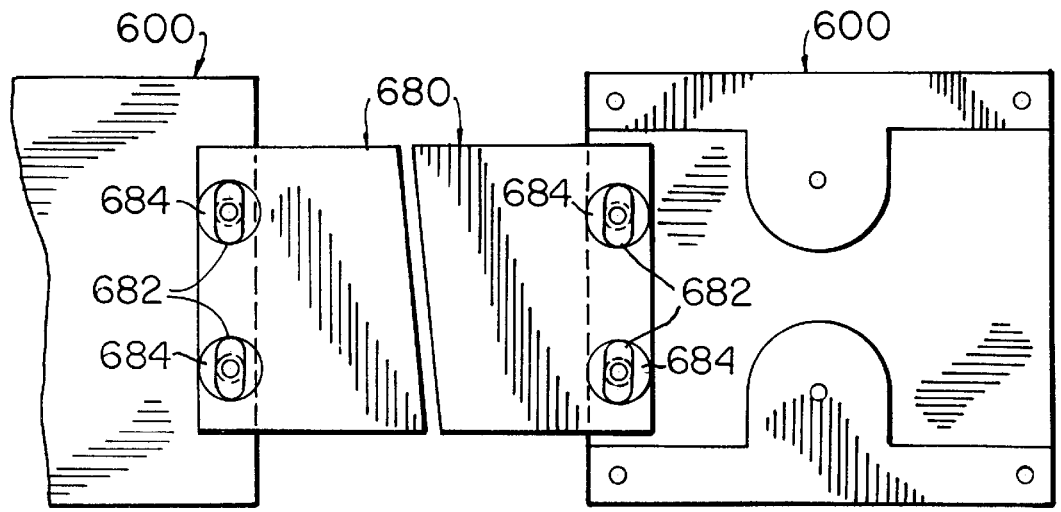
FIGS. 17A and 17B are diagrams to which reference will be made in explaining the use of adjustable gap stops.
Figure 17B:
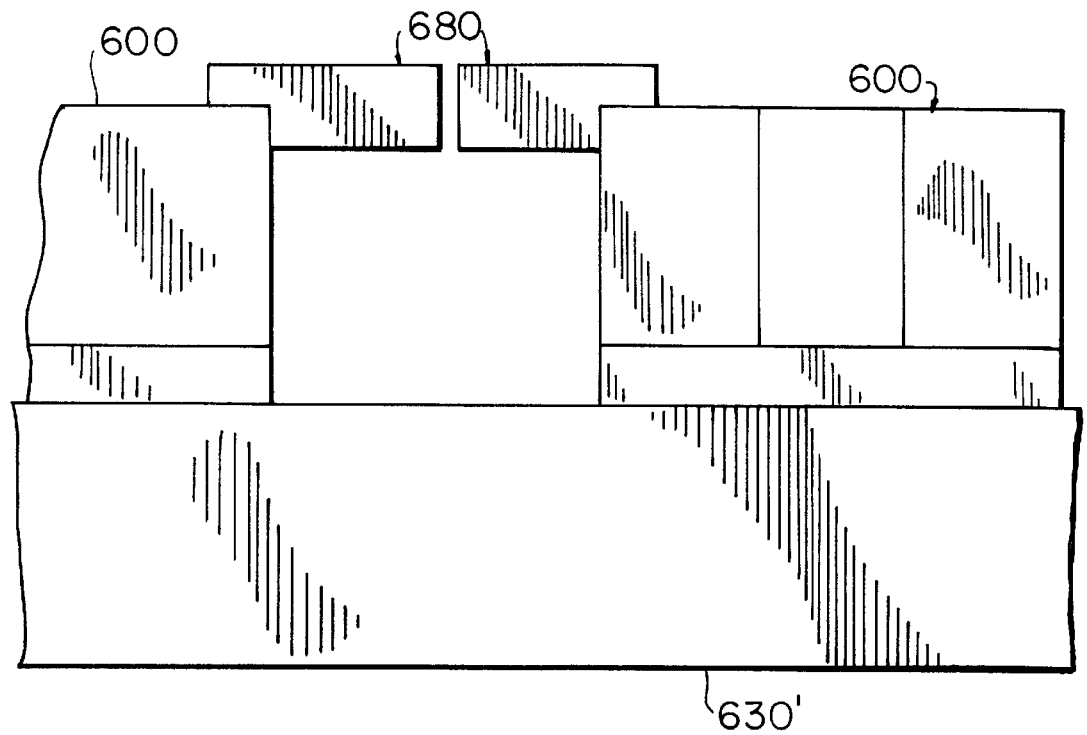

In certain situations, the bending of the actuated beam 630 may become excessive, which may overload one or more of the piezoceramic stacks 634 in compression. To prevent such overloading of the piezoceramic stack(s), adjustable gap stops 680 may be utilized as shown in FIGS. 17A and 17B. As shown therein, one side of each such stop may rest against an end of a respective support block 600 and the opposite side of each stop may form a stop surface having a slight inclination angle. The stops 680 may be secured to the support blocks 600 by use of screws 684 provided through slots 682. Such slots may enable the stops to be moved or positioned along a back and forth direction, thereby permitting the gap between the stops to be adjusted to the desired distance. During assembly, a filler gage or the like with the desired thickness may be placed between the stops 680, the stops may then be adjusted so as to hold the filler gage while pressing firmly on the support block surfaces, the stop screws 684 may then be tightened so as to secure the stops to the support blocks 600, and then the filler gage may be removed. Once installed, the stops 680 may prevent bending of a beam 630' in the direction of overloading the piezoceramic stack(s). The inclination angle may be small enough so that the friction force between the stops 680 along the sliding direction is larger than the shearing force due to their compression in a longitudinal direction of the support blocks by considering the coefficient of friction between the stop surfaces.

Piezoceramic stacks may be very brittle and may not be capable of withstanding a relatively high tensile load. Also, the assembly may be preloaded in compression up to the point that it may be subjected to tensile loading. Further, the actuated beam may bend in a direction so as to create a tensile force on the piezoceramic stack even though the stack/flexure element/support block assembly is preloaded in compression. Additionally, in certain situations, the actuated beam may be highly flexible or the beam may occasionally be subjected to excessive bending loads which may not be compensated for with excessive preloading, even if possible. In such situations, either of the following two approaches may be utilized.

First, a spring which is compressed to its solid length when the actuated beam is unbent may be placed between the respective support block and the respective flexure element or at a location along the length of the flexure element/piezoceramic stack assembly or may be built into the flexure element or the support block. In such situations, as the beam bends in a direction to generate tension in the piezoceramic stack, the compressive loading may first be overcome, and then the spring may begin to expand to fill the generated gap between the support blocks, thereby preventing the piezoceramic stacks from being subjected to tension.

Second, the screws holding at least one of the flexure elements to a support block may either be removed or spring washers may be used with such screws and placed between the flexure element(s) and the support block. The respective positioning pin(s) may be left in place and used as a guide for back and forth motion of the flexure element(s) with respect to the support block(s). As a result, tensile loading of the piezoceramic stack may be prevented.

Large motion lateral actuators will now be described with reference to FIGS. 18–21.

Figure 18:
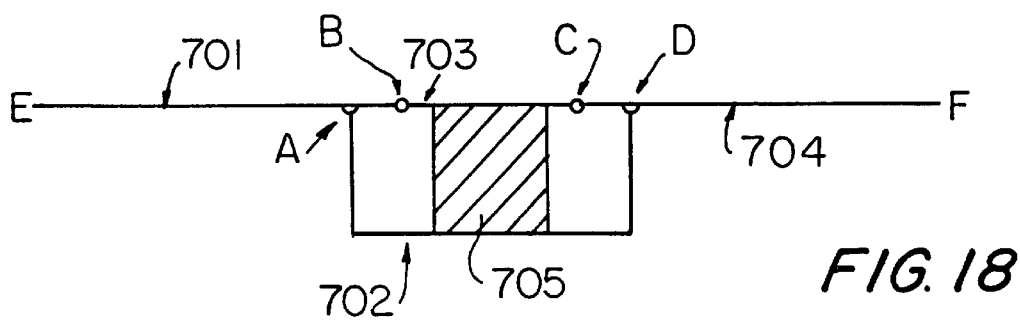
FIGS. 18–21 are diagrams to which reference will be made in explaining large motion lateral actuators.
Figure 19:
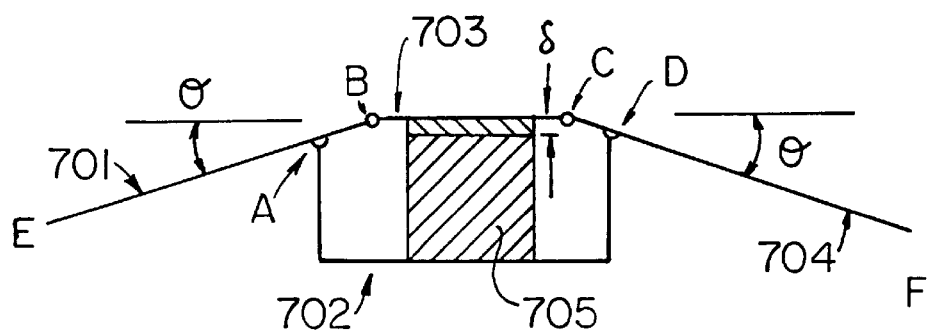
Figure 20:
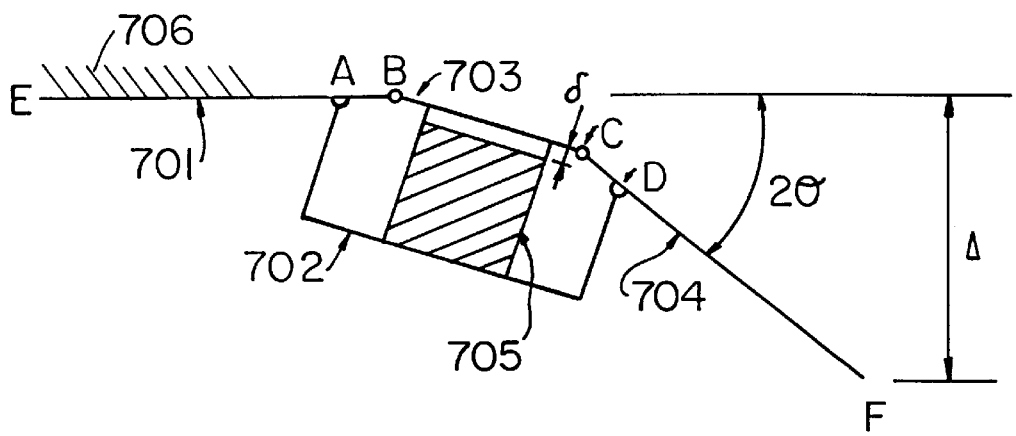

A relatively large motion lateral actuator is illustrated in FIG. 18. As shown therein, such actuator may include a piezoceramic stack actuator 705 and relatively rigid links 701, 702, 703, and 704, in which the links 701 and 703 are connected by a joint B, links 703 and 704 are connected by a joint C, and the channel shaped link 702 is connected to the links 701 and 704 by joints A and D, respectively. (Joints A and D are respectively attached to the rigid link 701 between an end E and the joint B and to the rigid link 704 between an end F and the joint C.) The piezoceramic stack actuator 705 may be fixed on one side to the link 702 and on another side to the link 703 as shown in FIG. 18. The piezoceramic stack actuator 705 may be elongated or expandable in one direction in a manner similar to the previously described actuators and may be arranged to elongate in a direction which displaces the link 703 relative to the link 702 a distance $\partial$ as shown in FIG. 19. As a result of the displacement $\partial$, the links 701 and 704 may rotate an angle $\theta$ about the joints B and C, respectively. The amount of generated rotation, $\theta$, for a given piezoceramic stack displacement, $\partial$, is dependent on the length of the segment of the link 701 between the joints A and B and the length of the segment of the link 704 between the joints C and D. In FIGS. 18–20, the segments AB and CD have the same length, and, as a result, the generated rotations are both equal (i.e., $\theta$). If $L_{AB}$ ($L_{CD}$) represents the length of the segment AB (CD), the angle $\theta$ may be defined by the relationship $\tan \theta = \partial/L_{AB}$ ($\tan \theta = \partial/L_{CD}$)

The above-described actuator may be arranged such that the link 701 is fixed to a body 706. As the piezoceramic stack 705 is elongated to the displacement $\partial$, the link 703 may rotate an angle $\theta$ relative to the link 701 and the link 704 may rotate an angle $\theta$ relative to the link 703, thereby providing a total rotation of 2$\theta$ of the link 704 relative to the link 701 (or the body of the large motion lateral actuator). As a result, a tip F of the link 704 may be displaced (laterally) a distance $\Delta$,(relative to the body of the large motion lateral actuator).

In the present large motion lateral actuator, the link 704 may be an output link and the displacement $\Delta$ (FIG. 20) may be an output displacement. In certain applications, the 2$\theta$ rotation may be utilized as the actuator output. As is to be appreciated, the actuator displacement $\Delta$ may be dependent on the length of the links 703 and 704 and the generated rotation 2$\theta$. Further, a total actuator mechanical amplification factor may be defined as the ratio between the output displacement and the piezoceramic elongation, i.e., $\Delta/\partial$.

Figure 21:
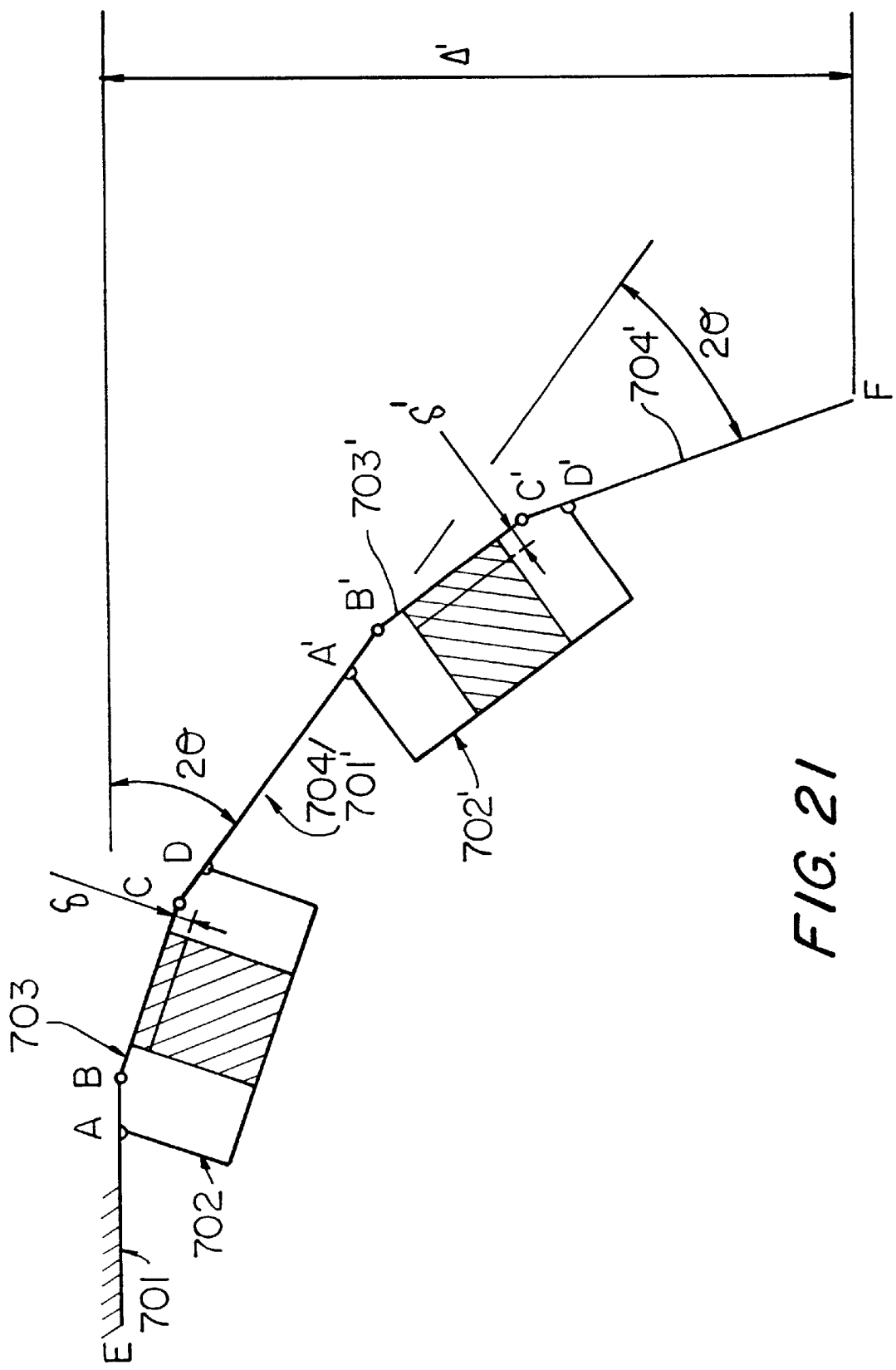

The above-described large motion lateral actuator (FIGS. 18–20) has one stage of actuation mechanism. However, the present large motion lateral actuator is not so limited and, instead, a plurality of stages may be attached together to produce the desired displacement and/or rotation. For example, as shown in FIG. 21, to obtain a two stage actuator, the link 701' of the second stage may be attached to or may become the link 704 (output) of the first stage. As a result, such two stage actuator may provide an output displacement of $\Delta'$.

Furthermore, the diagrams illustrated in FIGS. 18–21 may not represent the actual configurations of the actuators but are intended to aid in the description of the basic construction and/or operation of such actuators. For example, in the actual actuators, the joints A, B, C and/or D are preferably constructed with flexural elements that permit minimal resistance to the indicated rotations but are relatively rigid in other directions (namely those corresponding to shear, axial displacement, bending in the direction perpendicular to the desired rotation and torsion). As an example, to facilitate assembly and manufacture, the link 702 may be constructed as a ring that goes around the length of the links 701-703-704.

Large displacement piezoelectric ceramic type actuators will now be described.

Figure 22:
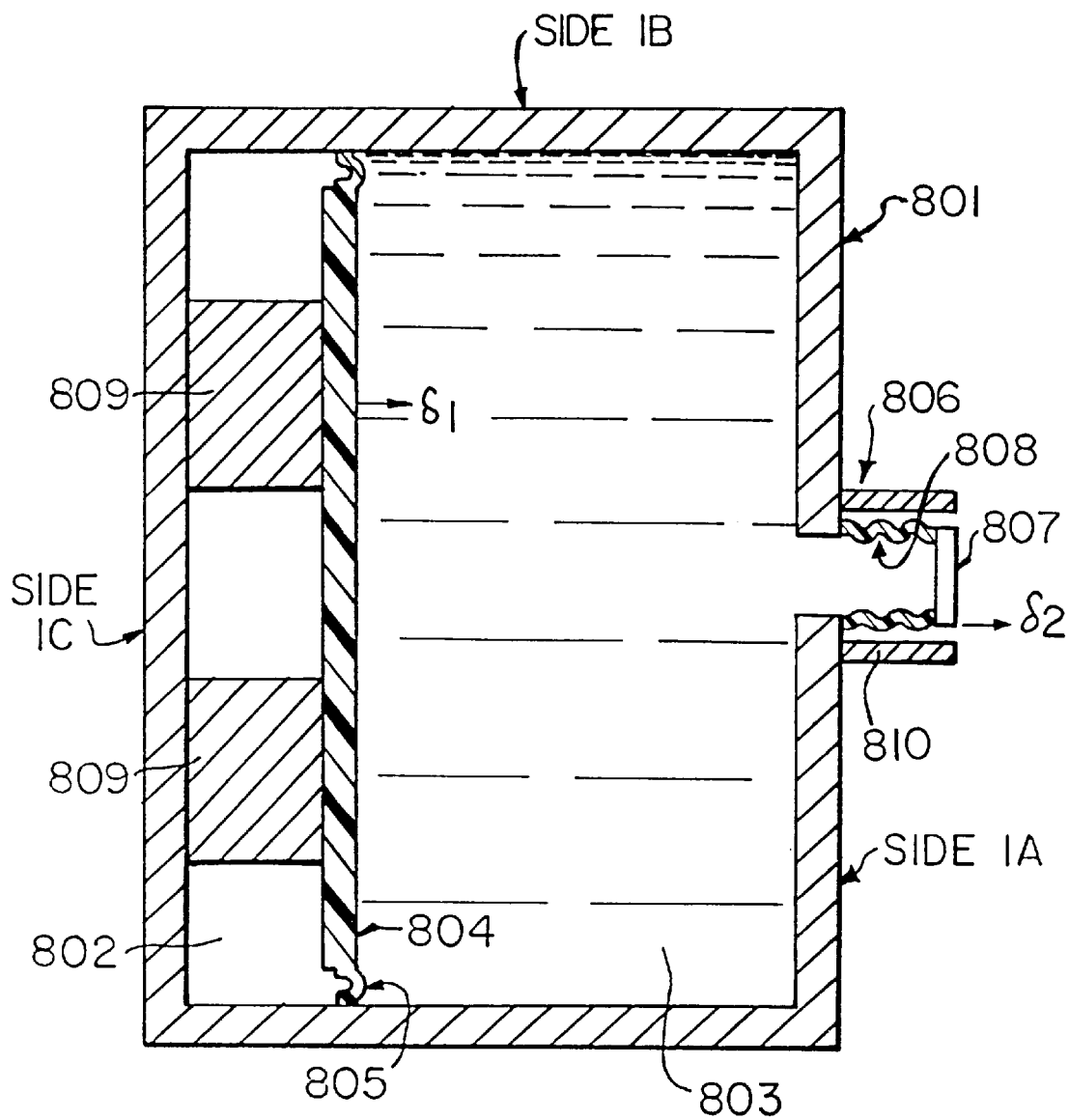
FIGS. 22–24 are diagrams to which reference will be made in explaining large displacement piezoelectric ceramic type actuators.

A large displacement piezoelectric ceramic type actuator having direct volume transfer is illustrated in FIG. 22. As shown therein, such actuator may include a relatively rigid container 801 which may have a cylindrical shape (circular side 1A), a rectangular (box type) shape, or other shapes. The container 801 may be partitioned into two compartments or cavities 802 and 803 by a wall 804. The wall 804 may be attached to the walls of the container 801 by a flexural ring 805 to permit the wall 804 to move laterally in the direction of the displacement $\partial_1$. The generated cavity 803 may be filled with a relatively incompressible fluid (such as hydraulic fluid). In the cavity 802, a number of piezoelectric ceramic stacks 809 may be arranged between the side 1C of the container 801 and the wall 804. The piezoelectric ceramic stacks 809 may be arranged such that the actuation or movement thereof may displace the wall 804 into the cavity 803 thereby increasing the gap or distance between the side 1C and the wall 804. As a result, the volume of the cavity 803 may be reduced by an amount $\partial_1 \times A_1$, where $A_1$ is the effective area of the wall (i.e., the total area of the wall 804 less the part covered by the flexural ring 805). Since the fluid contained in the cavity 803 is nearly incompressible, the displaced fluid may exit through an outlet 806. The outlet 806 may include a rigid top 807 having an area $A_2$ and a side wall 808 (preferably circular in cross-section) constructed to be relatively flexible in the direction corresponding to the $\partial_2$ of the top 807. The outlet 806 is preferably placed in a guide 810 to prevent lateral deflection thereof. The preferred material for various components of the actuator is steel.

The effective area of the wall 804 (i.e., $A_1$) may be much larger than the area of the outlet top 807 (i.e. $A_2$). As such, for a given displacement $\partial_1$ of the wall 804, the outlet top 807 may displace or move a much larger distance $\partial_2$. The ratio $\partial_2/\partial_1$ may be nearly proportional to the ratio of the areas $A_1/A_2$. (However, the displacement may be slightly less than the above area ratio due to the flexibility of the wall and outlet flexural elements and the flexibility of the container walls). As an example, for a cylindrically constructed container, if the effective diameter of the wall 804 is 4 inches and the diameter of the outlet top 807 is 0.5 inch, the following displacement amplification factor (i.e., the ratio of the displacement of the top, $\partial_2$, to the displacement of the piezoelectric ceramic stack, $\partial_1$) may be provided:

$$\partial_2/\partial_1 = A_1/A_2 = 4^2/0.5^2 = 256$$

The number of piezoelectric ceramic stacks 809 and their cross-sectional area (which may correspond to the amount of force/pressure which may be exerted on the wall 804) and their length (or the amount of displacement $\partial_1$ that may be produced) may be respectively dependent on the force and displacement that is desired at the actuator output (i.e., the outlet top 807). The maximum force that may be produced at the outlet 806 is inversely proportional to the aforementioned displacement amplification factor.

When a relatively small force is desired at the outlet 806, a motion amplification mechanism (for example, a lever type of amplification mechanism) may be utilized in the cavity 802 to amplify the displacement of the piezoelectric ceramic stack(s) 809 so as to produce a relatively large input displacement, $\partial_1$, for a given length (displacement) of the piezoelectric ceramic stack(s). As a result, the output displacement $\partial_2$ is increased.

Although the outlet 806 is shown as being located in the middle of the side 1A, the outlet 806 may be provided at other locations such as a location on the fluid filled cavity wall which may be appropriate for a given application. Further, the actuator container 801 may be constructed in any shape to match the space restriction of a selected application. Furthermore, although the above actuator was described with one wall 804, the present such actuator is not so limited and may instead have more than one moving wall 804 located on any side of the container 801. Additionally, the cavity may have a combination of fluid and an elastomer in which the elastomer may form a lining on the walls to seal the container and/or may add rigidity and control deformation at the flexural ring and/or may direct the fluid in a prescribed manner to generate internal damping, and so forth.

Large displacement piezoelectric ceramic type actuators having transfer volume amplification housings (hereinafter, "TVAH type actuators") will now be described. Such type of actuators may operate on the same principle as the actuators described with reference to FIG. 22, that is, on the basis of a piezoelectric ceramic stack(s) displacing a volume of an incompressible fluid in a cavity and the displaced volume of the fluid displacing an output end plate (similar to the top plate 807 of FIG. 22). The difference between the TVAH type of actuators and the FIG. 22 actuators is the design of the fluid cavity. In the TVAH type actuator, the fluid cavity may have a built-in mechanism that provides larger fluid volume displacement as compared to that of the FIG. 22 described actuators.

Figure 23:
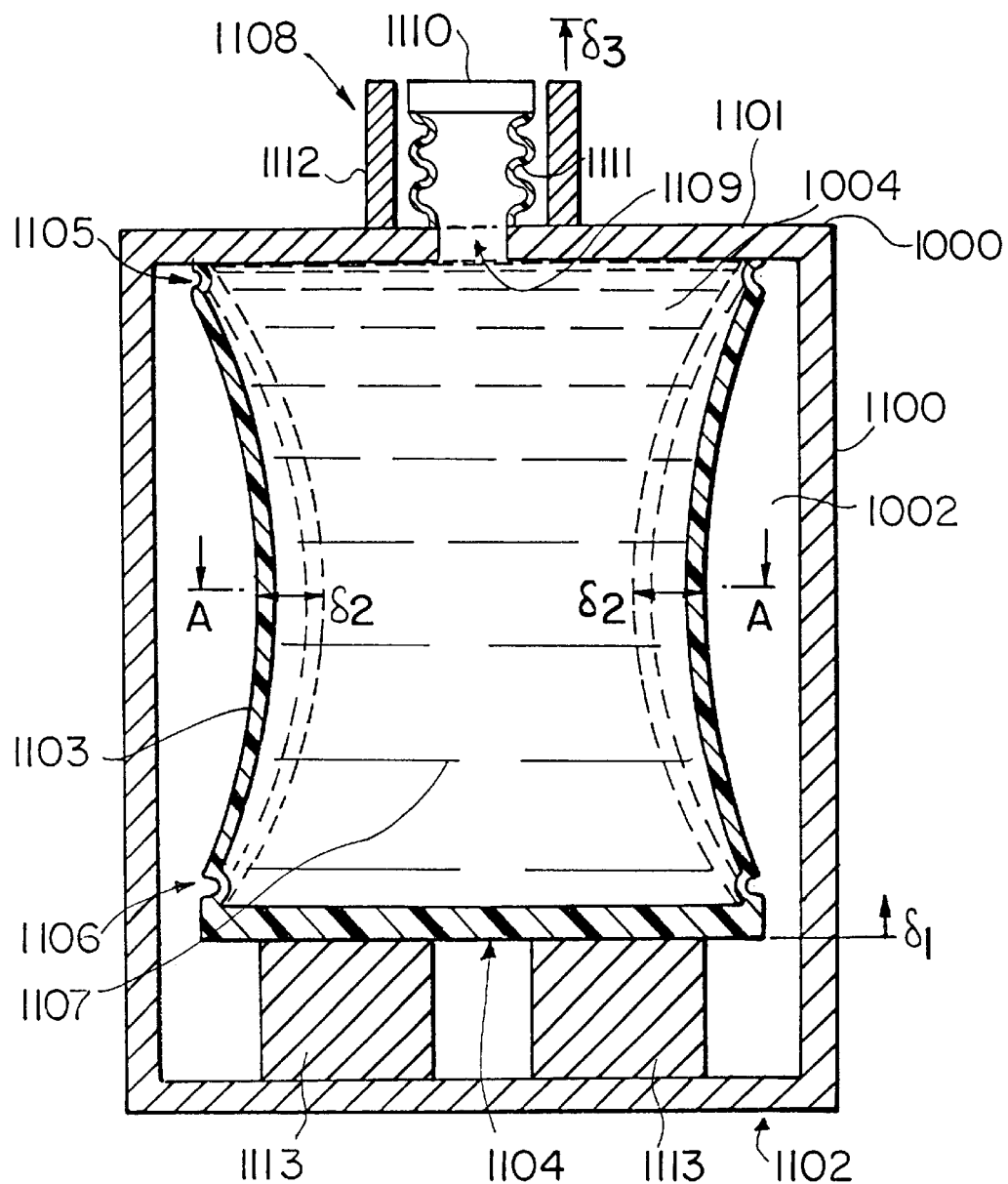

A TVAH type actuator is illustrated in FIG. 23. (In particular, FIG. 23 illustrates a cross-sectional view of the actuator along a plane containing the long axis of symmetry of the actuator.) As shown therein, such actuator may include a relatively rigid body 1000 having side 1100, top 1101 and bottom 1102. The actuator body 1000 is preferably cylindrical in shape although other shapes, such as a rectangular box and so forth, may be utilized. Within the actuator body, a cylindrical enclosure 1002 may be arranged having concavely shaped side walls 1103 and bottom 1104. Such enclosure preferably shares the top 1101 with the actuator body 1000. The side walls 1103 may be attached to the top 1101 and the bottom 1102 by flexural rings 1105 and 1106 which may permit the walls to deflect inward (towards the center of the enclosure) with minimum or relatively small resistance. A cavity 1004 inside the enclosure 1002 may be filled with a relatively incompressible fluid 1107 such as hydraulic fluid. One or more piezoelectric ceramic stacks 1113 may be placed between the actuator bottom 1102 and the enclosure bottom 1104. The piezoelectric stack(s) may be oriented such that when activated with an applied voltage a movable surface thereof may move the enclosure bottom plate 1104 an amount or displacement $\partial_1$ relative to the bottom 1102 of the body 1000. Such displacement $\partial_1$ of the enclosure bottom 1104 decreases the height of the enclosure and, as a result, may cause the enclosure wall 1103 to be pushed inward an amplified amount $\partial_2$ due to the nonlinear relationship between $\partial_2$ and $\partial_1$. (That is, this action may resemble a lever type of action). The amplification ratio $\partial_2/\partial_1$ may become larger as the depth of the curvature (at the midpoint of the wall) decreases.

The decrease in the volume of the enclosure 1002 due to the reduction in the height of the enclosure by the amount of $\partial_1$ and the movement of the wall 1103 into the enclosure by the amount of $\partial_2$ may displace the inside fluid the same or nearly the same amount due to the incompressible nature of the contained fluid. As a result, the displaced fluid volume will tend to exit through an outlet 1108. Such outlet may include an opening 1109 which opens into the enclosure 1002, a rigid top 1110 having an area A, and a side wall 1111 which preferably has a circular cross-section and which may be flexible in a direction corresponding to that of the displacement $\partial_3$ of the top 1110. The outlet 1108 is preferably placed in a guide 1112 to prevent lateral deflection thereof. For a displaced volume V and an outlet area A, the displacement (actuator output) may be approximately $\partial_3 = V/A$.

The TVAH type actuator may have the following advantages as compared to the previously described FIG. 22 type actuator: more incompressible fluid volume may be displaced for a given (input) displacement $\partial_1$ of the piezoelectric ceramic stack(s) due to the added displaced volume caused by the $\partial_2$ displacement of the enclosure wall 1103 into the enclosure 1002; and a more effective resistance to the walls enclosing the fluid from "bulging out" may be provided by the concavely shaped wall 1103, thereby providing a stiffer actuation mechanism.

Therefore, the TVAH type actuator may provide a larger displacement amplification (i.e., the displacement of the output relative to the displacement produced by the piezoelectric ceramic stack(s)) and a stiffer design as compared to the previously described FIG. 22 type of actuators.

Figure 24:
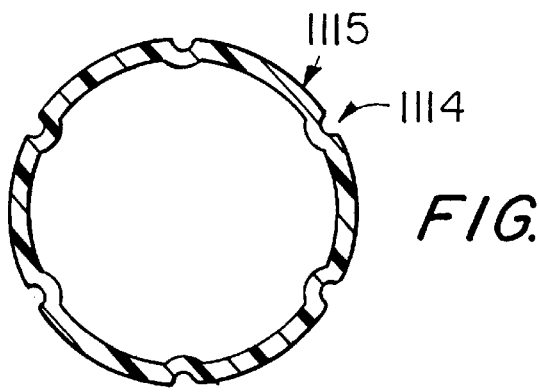

As an alternative, the above TVAH type actuator may be constructed as shown in FIG. 24 such that the enclosure has panels 1115 separated by longitudinally placed flexural joints 1114 for aiding the deflection of the wall 1103 into the incompressible fluid. (Note that FIG. 24 is a cross-sectional view in the direction A—A shown in FIG. 23.) The flexural elements 1114 and the panels 1115 may run along the length of the enclosure from the bottom plate 1104 to the top plate 1101.

Further, the main purpose of the side 1100 and bottom 1102 of the actuator body is to provide relatively rigid support for the piezoelectric ceramic stack(s) 1113 so as to enable the bottom 1104 of the enclosure to be pushed/moved to a new height. As such, the side 1100 and bottom 1102 may be constructed in a number of ways, including as a combination of beam and column-like elements, provided adequate rigidity/support is obtained.

Furthermore, the above-described actuators may be utilized with a servo control device in a manner similar to that previously described with regard to FIGS. 1A and 7. Additionally, such actuators may be arranged in any of the hereinabove and hereinafter described apparatus and may be utilized for vibration isolation and/or damping, micropositioning and so forth in a manner as previously described and as hereinafter described.

Figure 25:
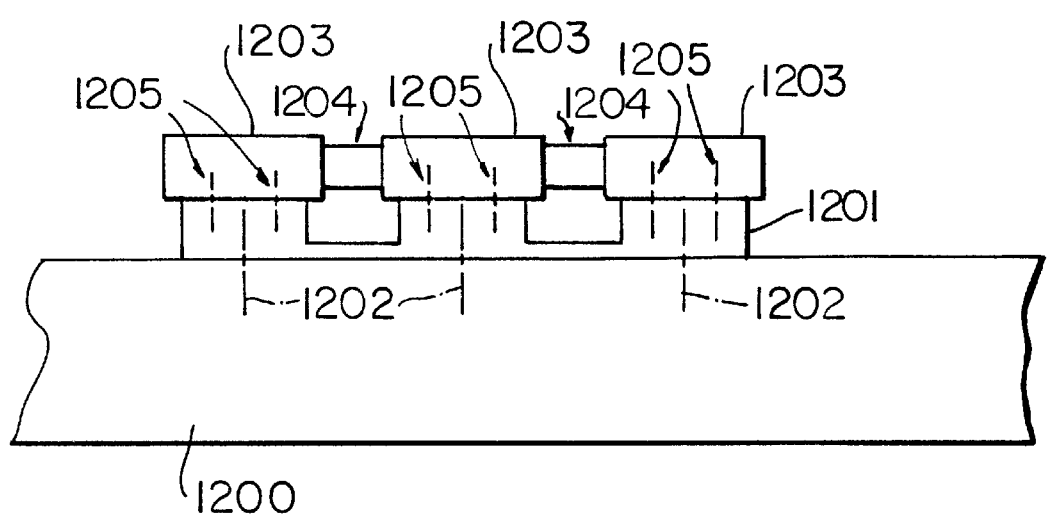
FIG. 25 is a diagram to which reference will be made in explaining a modification of the apparatus of FIGS. 7 or 8.

In addition, the actuator and the arrangement thereof previously described with reference to FIGS. 7 and 8 may be revised as illustrated in FIG. 25. Such actuator may include a support structure 1201, a number of blocks 1203 rigidly attached to the support preferably by screws 1205 or the like, and one or more piezoelectric ceramic stacks 1204 positioned between each pair of blocks 1203 and preferably bonded on both sides to the blocks 1203. The support structure 1201 may be attached to a structural member 1200 to be actuated by use of screws 1202, adhesive or other such means. The support structure may be a single piece or a plurality of modular pieces each adapted to be attached to the structural member 1200 in a manner similar to that previously described with regard to the arrangement of FIG. 14. Alternatively, the support structure may be an integral part of the structural member 1200. In any case, the support structure or supports are rigidly attached to the structural member to be actuated. The piezoelectric ceramic stacks are preferably preloaded in compression to avoid subjecting them to tensile stresses. Such preloading may be performed by using the device described with reference to FIGS. 15 and 16. The elongation of the piezoelectric ceramic stack(s) 1204 may apply a force on the blocks 1203 which may tend to separate/deflect the blocks, thereby applying a bending moment to the structural member 1200. The operation of the actuator and arrangement may be otherwise similar to the actuator and the arrangement previously described with reference to FIGS. 7 and 8 and, in the interest of brevity, will not be further described herein.

Thus, the above-described compensating attachment devices, the multi-stage compensating device(s) and actuators and arrangements thereof may be arranged or located directly on a flexible structure or component of a high performance machine or device. As a result of such location of the present compensating devices, problems due to non-collocation between the compensating device and the portion of the high performance machine which is desired to be pointed, positioned or orientated and problems due to non-linearities (such as stiction, friction, backlash, non-linear elasticity due to drive train, and so forth) therebetween may be avoided. Further, such present compensating devices may be arranged so as to counteract a vibration mode or modes of the flexible structure or component or to transfer the modal energy from one mode to that of another.

Although the above embodiments have been described as including a servo control device thereby enabling the respective compensating apparatus to operate in a closed loop manner, the present invention is not so limited. That is, such apparatus may operate without a servo control device in an open loop manner. As an example, consider the situation wherein the input disturbances or deflections are periodic and the pertinent values, such as amplitude and frequency, of such disturbances or deflections are known. In this situation, a feedforward or a predetermined compensation control signal can be applied to the appropriate one or ones of the actuators in an open loop manner so as to compensate for such deflection. Further, such open loop driven apparatus may be utilized to deflect or move a device so as to damp or excite the device in a predetermined manner.

Other embodiments of the present invention will now be described with reference to FIGS. 9–11. Such embodiments may be utilized to reduce vibration inputs to a device and/or to accurately position a device.

Figure 9:
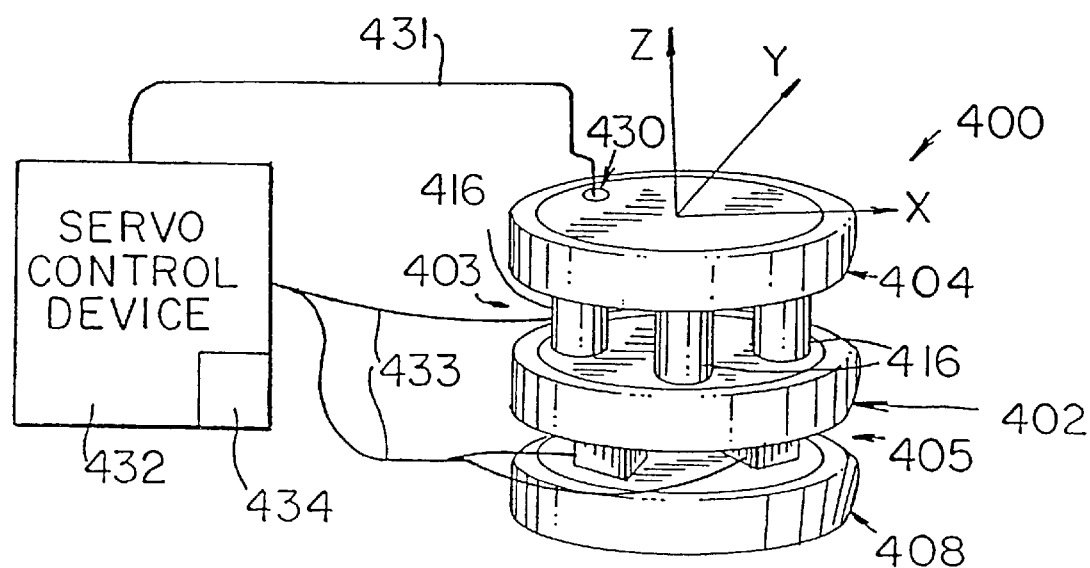
FIG. 9 is a perspective view of an apparatus for reducing vibration inputs to a device and/or for positioning a device according to another embodiment of the present invention.

A vibration isolation apparatus 400 is illustrated in FIG. 9. As shown therein, such vibration isolation apparatus generally includes a servo control device 432 and modules 403 and 405.

Figure 10A:
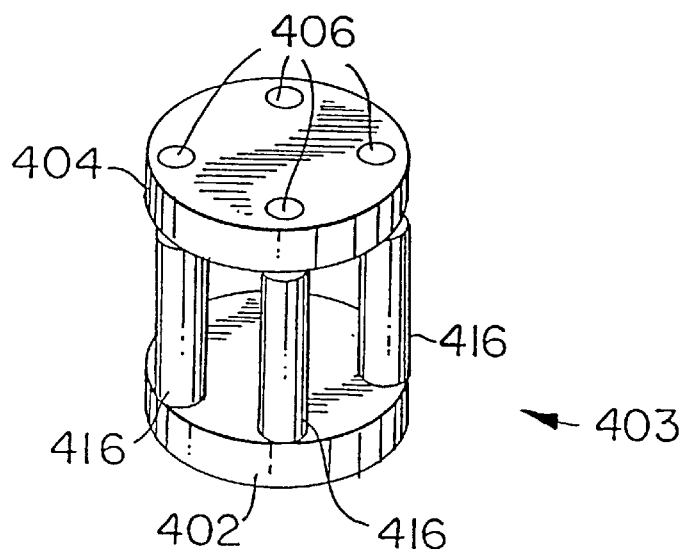
FIGS. 10A and 10B are perspective views of modules which may be utilized in the apparatus of FIG. 9.

The module 403, as illustrated in FIG. 10A, includes an upper plate 404, a plurality of actuators 416, and a base plate 402. Each of the actuators 416, which may be similar to the previously described actuators 16 (FIG. 1), are securely coupled between the upper plate 404 and the base plate 402. Further, the actuators 416 are arranged such that a movable portion thereof, such as the actuating rod 162 (FIG. 5), is movable along a direction Z (FIG. 9) which is preferably perpendicular to the upper plate 404 and the base plate 402. Preferably, at least three actuators 416 are utilized, although a lesser number could also be used. The upper plate 404 includes a plurality of holes 406, which may be threaded holes. The base plate 402 includes a plurality of holes (not shown) which may correspond to holes 414 (FIG. 11). The device (not shown) which is desired to be vibration isolated is secured to upper or top surface of the upper plate 404 by use of the holes 406. The other end of the vibration isolation apparatus is grounded or attached to the base of the machine using the apparatus or such similar location.

Figure 10B:
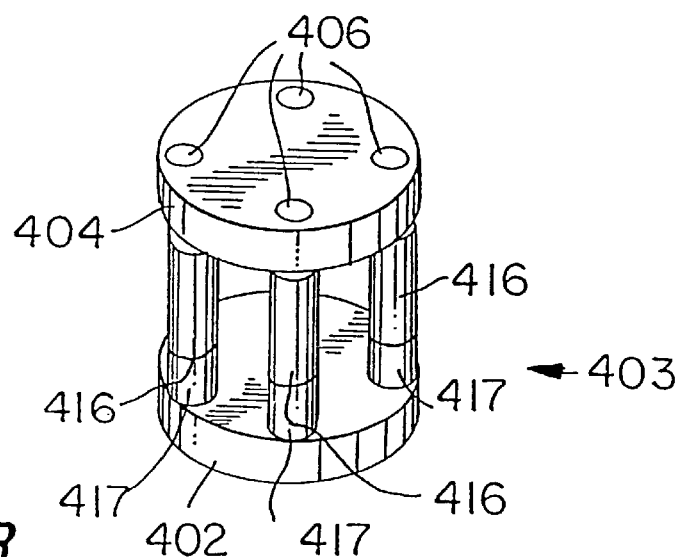

Although the upper plate 404 and the base plate 402 are preferably located relatively close together, the present invention is not so limited. That is, support columns, similar to the support columns 18 (FIG. 1), may be utilized when additional spacing between the upper and base plates is desired. Alternatively, an actuator 417 which may be a motor, such as a linear motor, or a hydraulic, pneumatic or electric actuator, or other similar type of linear actuator may be utilized. That is, as illustrated in FIG. 10B, one such actuator 417 is respectively coupled to the each of the actuators 416. Such arrangement of actuators 416 and 417 may increase the permissible range of displacement of the module 403 and/or may more easily provide for movements having relatively low frequency high amplitude displacements and high frequency low amplitude displacements, in a manner similar to that previously described with reference to the actuator/support column 17 of FIG. 1.

The vibration isolation apparatus 400 may be utilized for isolating a platform, such as, a bed or cot for transporting a patient in an ambulance so as to prevent further injuries during the transporting of the patient, payload platform for rockets and spacecrafts particularly those under microgravity constraints from accelerations and/or shocks, and a mounting base for a gun turret system from variations in terrain and structural vibrations, and so forth.

By activating one or ones of the actuators 416, the module 403 may provide axial displacements, that is, displacements along the Z direction, and/or rotational movements about axes perpendicular to it, such as the X and Y axes.

Figure 11:
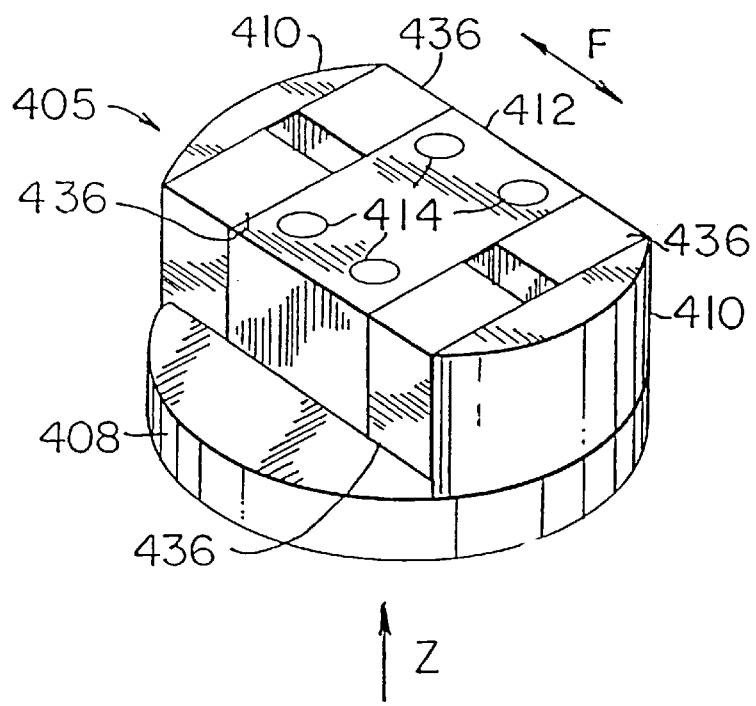
FIG. 11 is a perspective view of another module which may be utilized in the apparatus of FIG. 10.

The module 405, as illustrated in FIG. 11, includes a base plate 408, side supports 410, a plurality of actuators 436, and an actuated block 412. As shown in FIG. 11, the actuators 436 are arranged in two groups. That is, two of the actuators 436 are arranged between one of the side supports 410 and the actuated block 412, and two other actuators are arranged between the other of the side supports and the actuated block 412. Further, each of the actuators 436 are arranged such that a movable or active portion thereof is movable along a F direction. The actuated block may include a plurality of holes 414, such as threaded holes, which may be utilized to secure the module 405 to the base plate 402 of the module 403 or to the device desired to be vibration isolated. The side supports 410 are securely fastened to the base plate 408. Alternatively, the side supports 410 and the base plate 408 may be formed as a single unit.

By activating one or ones of the actuators 436, the module 405 may provide rotational movements and/or lateral movements or displacements. More specifically, by activating diagonal ones of the actuators 436, the module may be rotationally moved about an axis through the center of the module, that is, the Z axis. On the other hand, by similarly activating the actuators 436 in at least one of the groups, a displacement or movement along the F direction is obtained.

Referring back to FIG. 9, the servo control device 432 includes a processing device 434 which operates in a manner similar to that of the servo control device 32 (FIG. 1). That is, the vibration input to the device (not shown) mounted on the upper plate 404 is sensed by a sensor 430 and a signal corresponding thereto is supplied therefrom to the servo control device 432 by way of a lead 431. The processing device 434 processes the received signal in accordance with a predetermined algorithm which may be similar to that previously described with reference to FIG. 12 and, based upon the results therefrom, a control signal is supplied from the servo control device to the appropriate one(s) of the actuators 416 and 436 (FIG. 11) by way of leads 433. As a result, the respective one or ones of the modules 403 and 405 are caused to move or rotate so as to counteract or compensate for the detected vibration input.

As is to be appreciated, the vibration isolation apparatus 400 permits five degrees-of-freedom, that is, the module 403 permits three degrees-of-freedom and the module 405 permits two degrees-of-freedom. More specifically, the module 403 permits movement in the Z direction by similarly activating each of the actuators 416, and permits rotation about either of the X or Y directions by activating appropriate one(s) of the activators 416. The module 405 permits rotation about the Z direction by activating diagonal one(s) of the actuators 436, and permits movement along the F direction (which may correspond to either of the X or Y axes) by similarly activating at least one group of the actuators 436, as previously described.

Further, although the vibration isolation apparatus 400 includes two modules 403 and 405 as previously described, the present invention is not so limited. That is, the present vibration isolation apparatus may include any number of such modules. As is to be appreciated, by selectively choosing one or more modules, a vibration isolation apparatus may be provided which can permit any number of degrees-of-freedom and/or can provide increased lateral and/or axial and/or rotational movement. For example, by adding another module 405 to the apparatus 400 of FIG. 9, which is rotated 90 degrees about the Z direction relative to the other module 405, enables six degrees-of-freedom. Further, by adding another module to this arrangement, increased movements along the X, Y and/or Z directions may be obtained. That is, suppose it is desired to permit a movement of 2N along the Z direction and the actuators 416 have a total travel of only N. In this situation, two of modules 403 may be utilized, each permitting a movement of N for a total movement of 2N. As another example, by utilizing two of the modules 405, in which one is rotated 90 degrees about the Z direction relative to the other, enables movements in the X and Y directions and further permits an increased allowable range of rotation about the Z direction.

The above-described vibration isolation apparatus may be utilized to provide micro-positioning of a device attached thereto at a relatively high bandwidth. Such apparatus may accommodate large motions with a high degree of accuracy to achieve micro-positioning. In this situation, the vibration closed loop feedback arrangement in the apparatus 400 of FIG. 9 is not utilized and such apparatus is merely adjusted to the desired position by activating the appropriate one or ones of the actuators 416 and/or 436. Such micro-positioning may be performed in conjunction with vibration isolation and/or damping. For example, in the situation of a gun turret system, this apparatus may not only be used as a vibration isolation apparatus as previously described, but may also be simultaneously used as a micro-positioner to correct orientation and/or pointing of the gun barrel of the gun turret system.

Furthermore, although in describing one or more of the various embodiments of one present invention, specific arrangements and/or types of components may have been described, the present invention is not so limited and other arrangements and/or types of components may also be utilized. For example, any of the above-described types of actuators may be used with any of the above-described apparatuses.

Accordingly, the present invention provides an apparatus for compensating for deflections of a member so as to compensate for pointing, positional and orientational inaccuracies or errors. Further, the present invention provides an apparatus for isolating a device from externally generated vibrations. Such present apparatus are highly accurate and relatively stable, and have a relatively fast response time and a relatively large bandwidth so as to accommodate a large range of motion. Furthermore, the present invention provides an apparatus for positioning a device with a relatively high degree of accuracy throughout a large range of motion.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. An actuator apparatus comprising:

at least one actuator device movable in a predetermined direction;

a chamber having an outlet portion, a deflectable portion, and a movable wall coupled to the at least one actuator device, said chamber having an inner portion with a relatively incompressible fluid contained therein; and a movable end portion located at the outlet portion of said chamber;

wherein said moveable wall is moved causing the deflectable portion to be deflected in response to the movement of the at least one actuator device, and wherein the movement of said movable wall causes a first volume of the fluid to be displaced and the deflection of the deflectable portion causes a second volume of the fluid to be displaced which together cause the end portion to be moved an amount greater than that which would result from displacing only the first volume of the fluid, and wherein a distance across a cross-section of the inner portion of said chamber prior to movement of said movable wall is greater than the distance across the cross-section of the inner portion of said chamber after the movement of said movable wall.

2. An apparatus according to claim 1, wherein, in response to the movement of the at least one actuator device, said movable wall is moved an amount X and the deflectable portion is deflected a maximum amount Y in which Y>X.

3. An actuator apparatus comprising:

a housing having an opening;

a chamber arranged within said housing and having a deflectable portion and a movable wall, said chamber having an inner portion with a relatively incompressible fluid contained therein;

at least one actuator device coupled to said movable wall and said housing and being movable in a predetermined direction; and a movable end portion located at the opening of said housing and arranged so as to be contactable with the fluid;

wherein said moveable wall is moved causing the deflectable portion to be deflected in response to the movement of the at least one actuator device, and wherein the movement of said movable wall causes a first volume of the fluid to be displaced and the deflection of the deflectable portion causes a second volume of the fluid to be displaced which together cause the end portion to be moved an amount greater than that which would result from displacing only the first volume of the fluid, and wherein a distance across a cross-section of the inner portion of said chamber prior to movement of said movable wall is greater than the distance across the cross-section of the inner portion of said chamber after the movement of said movable wall.

4. An apparatus according to claim 3, wherein, in response to the movement of the at least one actuator device, said movable wall is moved an amount X and the deflectable portion is deflected a maximum amount Y in which Y>X.

5. An actuator apparatus comprising:

at least one actuator device movable in a predetermined direction;

a chamber having an outlet portion, a deflectable portion, and a movable wall coupled to the at least one actuator device, said chamber having an inner portion with a relatively incompressible fluid contained therein; and a movable end portion located at the outlet portion of said chamber;

wherein said moveable wall is moved causing the deflectable portion to be deflected inward so as to decrease a volume of said inner portion in response to the movement of the at least one actuator device, and wherein the movement of said movable wall causes a first volume of the fluid to be displaced and the deflection of the deflectable portion causes a second volume of the fluid to be displaced which together cause the end portion to be moved an amount greater than that which would result from displacing only the first volume of the fluid.

6. An apparatus according to claim 5, wherein, in response to the movement of the at least one actuator device, said movable wall is moved an amount X and the deflectable portion is deflected a maximum amount Y in which Y>X.

7. An actuator apparatus comprising:

a housing having an opening;

a chamber arranged within said housing and having a deflectable portion and a movable wall, said chamber having an inner portion with a relatively incompressible fluid contained therein;

at least one actuator device coupled to said movable wall and said housing and being movable in a predetermined direction; and a movable end portion located at the opening of said housing and arranged so as to be contactable with the fluid;

wherein said moveable wall is moved causing the deflectable portion to be deflected inward so as to decrease a volume of said inner portion in response to the movement of the at least one actuator device, and wherein the movement of said movable wall causes a first volume of the fluid to be displaced and the deflection of the deflectable portion causes a second volume of the fluid to be displaced which together cause the end portion to be moved an amount greater than that which would result from displacing only the first volume of the fluid.

8. An apparatus according to claim 7, wherein, in response to the movement of the at least one actuator device, said movable wall is moved an amount X and the deflectable portion is deflected a maximum amount Y in which Y>X.

9. An actuator apparatus comprising:

at least one actuator device movable in a predetermined direction;

a chamber having an outlet portion, a plurality of deflectable panels arranged such that two adjacent panels are separated therebetween by a respective flexural joint which allow the panels to be deflected in an inward direction, and a movable wall coupled to the at least one actuator device, said chamber having a relatively incompressible fluid contained therein; and a movable end portion located at the outlet portion of said chamber;

wherein said moveable wall is moved causing the deflectable panels to be deflected inward in response to the movement of the at least one actuator device, and wherein the movement of said movable wall causes a first volume of the fluid to be displaced and the deflection of the deflectable panels causes a second volume of the fluid to be displaced which together cause the end portion to be moved an amount greater than that which would result from displacing only the first volume of the fluid.

10. An actuator apparatus according to claim 9, wherein each flexure joint of the deflectable panels has a longitudinal axis associated therewith which is substantially parallel to the predetermined direction.

11. An actuator apparatus comprising:

at least one actuator device movable in a predetermined direction;

a chamber having an outlet portion, a plurality of deflectable walls arranged such that two adjacent walls are separated therebetween by a respective longitudinal flexure which allow the walls to be deflected in an inward direction, and a movable wall coupled to the at least one actuator device, said chamber having a relatively incompressible fluid contained therein; and a movable end portion located at the outlet portion of said chamber;

wherein said moveable wall is moved causing the deflectable walls to be deflected inward in response to the movement of the at least one actuator device, and wherein the movement of said movable wall causes a first volume of the fluid to be displaced and the inward deflection of the deflectable walls causes a second volume of the fluid to be displaced which together cause the end portion to be moved an amount greater than that which would result from displacing only the first volume of the fluid.

12. An actuator apparatus according to claim 11, wherein each flexure of the deflectable walls has a longitudinal axis associated therewith which is substantially parallel to the predetermined direction.

* * * * *